(12) United States Patent
Helin et al.

(10) Patent No.: US 9,175,756 B2
(45) Date of Patent: Nov. 3, 2015

(54) SPEED CONTROL ASSEMBLY FOR A SELF-PROPELLED WALK BEHIND LAWN MOWER

(71) Applicant: MTD Products Inc, Valley City, OH (US)

(72) Inventors: Philip Helin, Peninsula, OH (US); Rick Baehr, Wellington, OH (US)

(73) Assignee: MTD Products Inc, Valley City, OH (US)

( * ) Notice: Subject to any disclaimer, the term of this patent is extended or adjusted under 35 U.S.C. 154(b) by 0 days.

(21) Appl. No.: 14/331,844

(22) Filed: Jul. 15, 2014

(65) Prior Publication Data

US 2014/0329627 A1 Nov. 6, 2014

Related U.S. Application Data

(62) Division of application No. 13/250,209, filed on Sep. 30, 2011.

(51) Int. Cl.
*A01D 69/00* (2006.01)
*F16H 9/12* (2006.01)
(Continued)

(52) U.S. Cl.
CPC .............. *F16H 9/12* (2013.01); *A01D 34/006* (2013.01); *A01D 34/6806* (2013.01);
(Continued)

(58) Field of Classification Search
CPC ..... F16H 55/56; F16H 61/662; F16H 63/067; F16H 9/18; F16H 7/14; F16H 9/12; A01D 2101/00; A01D 2034/6843; A01D 69/08; A01D 34/6806; A01D 34/69
USPC ............ 474/101, 115, 37, 46, 69, 19, 11, 21, 474/43; 56/11.3, 10.8, 11.8; 180/19.3
See application file for complete search history.

(56) References Cited

U.S. PATENT DOCUMENTS 4,034,835 A 7/1977 Baba
4,117,652 A * 10/1978 Jones et al. ............... 56/11.8
(Continued)

FOREIGN PATENT DOCUMENTS

AU  50284-64   10/1964
WO  98/10205    3/1998
(Continued)

OTHER PUBLICATIONS

Sears website for Craftsman 190cc 22" Briggs & Stratton Rear Bag Rear High Wheel Front Propelled Lawn Mower (Model 37653), Feb. 2009.
(Continued)

*Primary Examiner* — Arpád Fábián-Kovács
(74) *Attorney, Agent, or Firm* — Wegman, Hessler & Vanderburg

(57) ABSTRACT

A speed control mechanism for controlling selective engagement of the self-propelled transmission assembly for a walk-behind lawn mower is provided. The speed control mechanism is also configured to control the relative output speed of the transmission assembly. The speed control mechanism includes a speed engagement assembly and a speed adjustment assembly, wherein the speed engagement assembly includes a pair of rotatable levers for causing the transmission assembly to actuate between a disengaged position and an engaged position and the speed adjustment assembly includes a rotatable knob for causing the relative output speed of the transmission assembly to the wheels of the lawn mower to increase or decrease.

18 Claims, 15 Drawing Sheets

(51) Int. Cl.
*A01D 34/68* (2006.01)
*A01D 34/82* (2006.01)
*A01D 34/00* (2006.01)
*F16H 59/02* (2006.01)
*F16H 59/06* (2006.01)

(52) U.S. Cl.
CPC ............ *A01D 34/824* (2013.01); *F16H 9/125* (2013.01); *F16H 59/0278* (2013.01); *F16H 59/06* (2013.01); *Y10T 74/2014* (2015.01)

(56) References Cited

U.S. PATENT DOCUMENTS

| | | | | |
|---|---|---|---|---|
| 4,523,917 | A | * | 6/1985 | Schildt .............................. 474/19 |
| 4,667,459 | A | | 5/1987 | Scanland et al. |
| 4,907,401 | A | * | 3/1990 | Nemoto et al. ................. 56/11.3 |
| 4,969,856 | A | * | 11/1990 | Miyata et al. ..................... 474/11 |
| 5,251,711 | A | * | 10/1993 | Meyer et al. ................. 180/19.1 |
| 5,254,041 | A | * | 10/1993 | Duclo ............................. 474/14 |
| 5,803,847 | A | * | 9/1998 | Kamm ............................ 474/37 |
| 6,070,487 | A | | 6/2000 | Beugelsdyk et al. |
| 6,146,295 | A | * | 11/2000 | Mor et al. ....................... 474/13 |
| 6,312,355 | B1 | | 11/2001 | Nishimoto |
| RE37,728 | E | | 6/2002 | Kamm |
| 6,413,178 | B1 | * | 7/2002 | Chamberland ................. 474/19 |
| 6,475,109 | B2 | * | 11/2002 | Blanchard ..................... 474/101 |
| 6,502,479 | B1 | * | 1/2003 | Lee ............................. 74/568 R |
| 6,572,508 | B2 | | 6/2003 | Shoge |
| 6,705,961 | B2 | * | 3/2004 | Johnson et al. ................... 474/8 |
| 6,796,392 | B2 | | 9/2004 | Kobayashi et al. |
| 6,837,353 | B2 | * | 1/2005 | Watt ........................... 192/54.52 |
| 6,994,643 | B2 | * | 2/2006 | Kalies ............................ 474/46 |
| 7,162,858 | B2 | | 1/2007 | Graham |
| 7,263,818 | B2 | | 9/2007 | Osborne |
| 7,293,397 | B2 | | 11/2007 | Osborne |
| 7,698,881 | B2 | | 4/2010 | McCane et al. |
| 7,850,555 | B2 | * | 12/2010 | Keane et al. .................... 474/19 |
| 8,100,791 | B2 | * | 1/2012 | Yamaguchi et al. ............ 474/28 |
| 8,496,551 | B2 | * | 7/2013 | Mueller et al. ................. 474/17 |
| 2002/0153179 | A1 | | 10/2002 | Kobayashi et al. |
| 2002/0183145 | A1 | * | 12/2002 | Blanchard ....................... 474/19 |
| 2007/0275821 | A1 | | 11/2007 | Kawakami et al. |
| 2009/0191992 | A1 | * | 7/2009 | Osborne ......................... 474/12 |
| 2011/0000175 | A1 | | 1/2011 | Lahey et al. |
| 2011/0000176 | A1 | * | 1/2011 | Lahey et al. ................... 56/10.8 |

FOREIGN PATENT DOCUMENTS

| | | |
|---|---|---|
| WO | 2010/002298 | 1/2010 |
| WO | 2012/115543 | 8/2012 |

OTHER PUBLICATIONS

Craftsman Rotary Lawn Mower Model No. 917.371031 Manual, EZ Walk Drive Control Assembly, p. 9-10, 44, Dated Apr. 21, 2009.
Husqvarna HU775H Manual, Auto Walk Control System, p. 6, 7, 10, 18, No Date.
International Preliminary Report on Patentability, dated Apr. 10, 2014, in corresponding PCT Application No. PCT/US2012/057174.
International Search Report and Written Opinion, dated Dec. 6, 2012, in corresponding PCT Application No. PCT/US2012/057174.

* cited by examiner

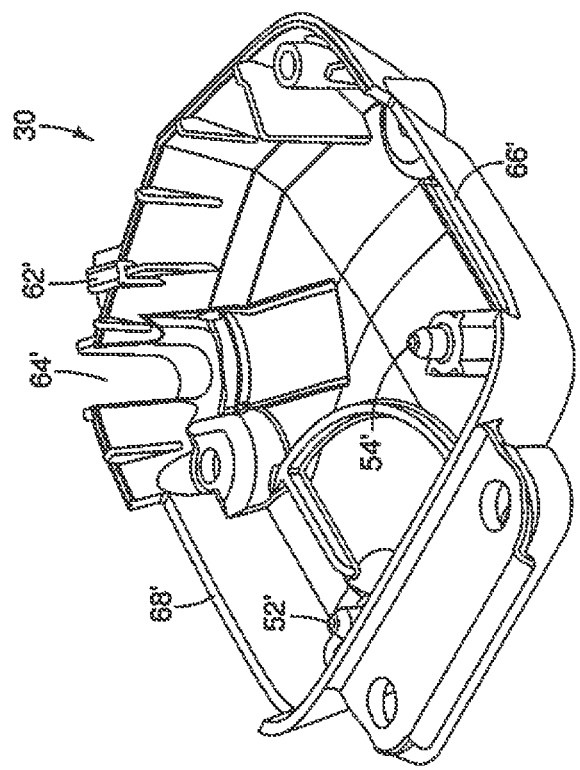
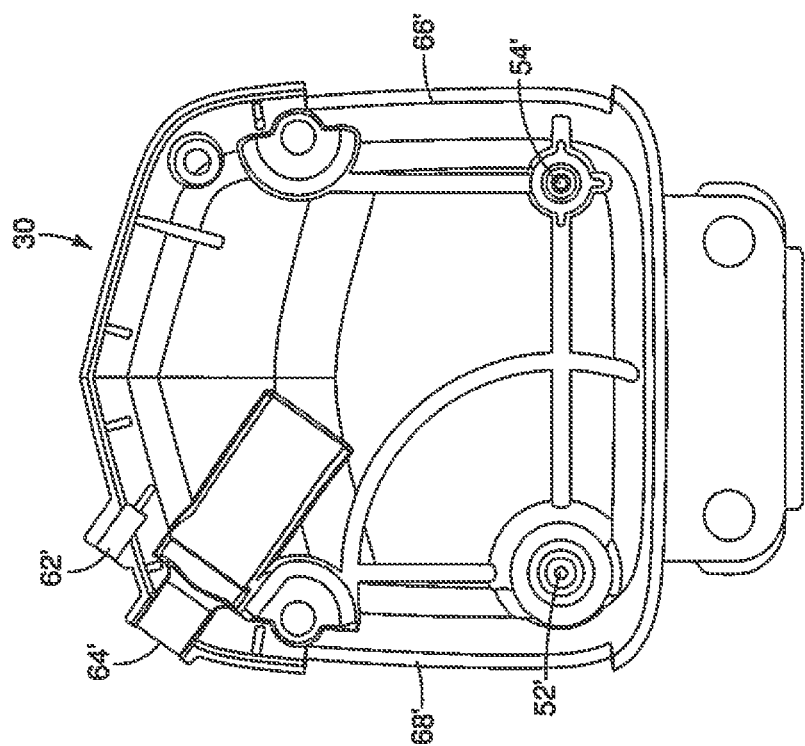
FIG. 6B
FIG. 6A

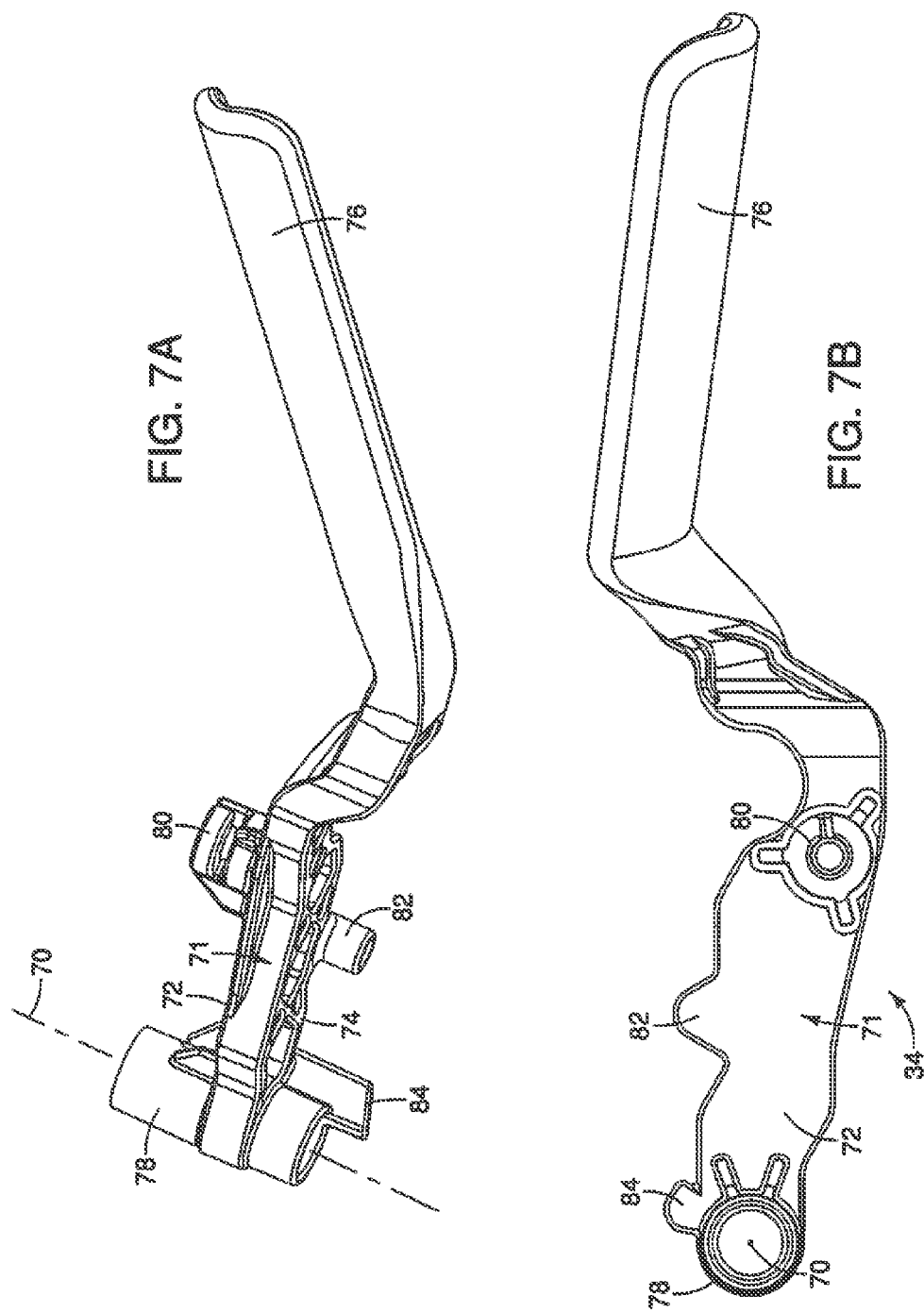

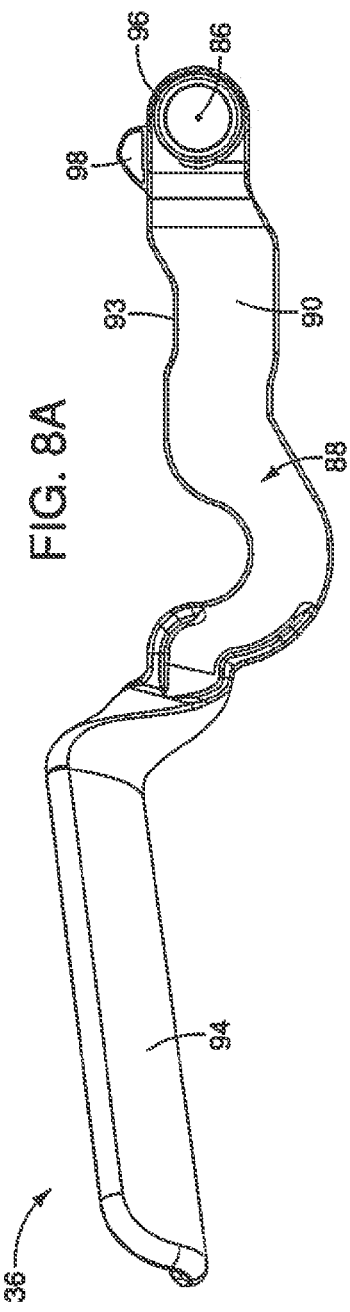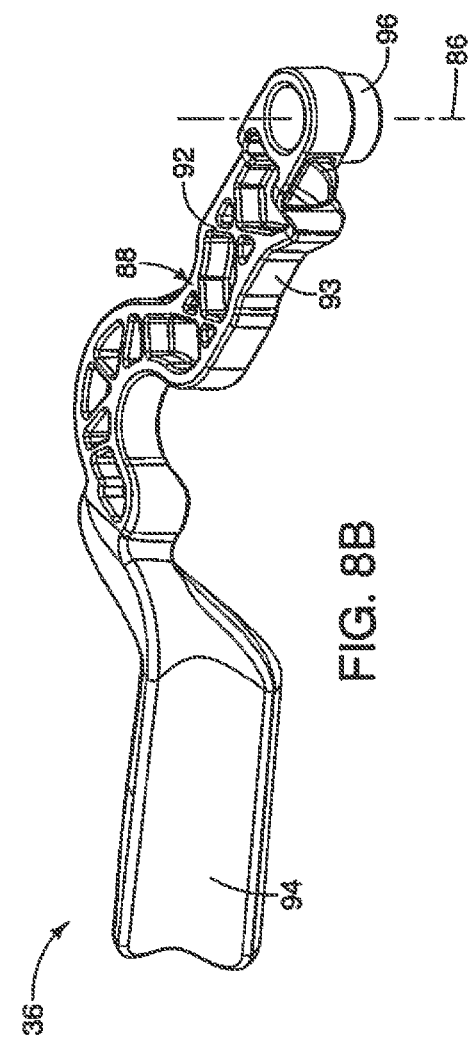

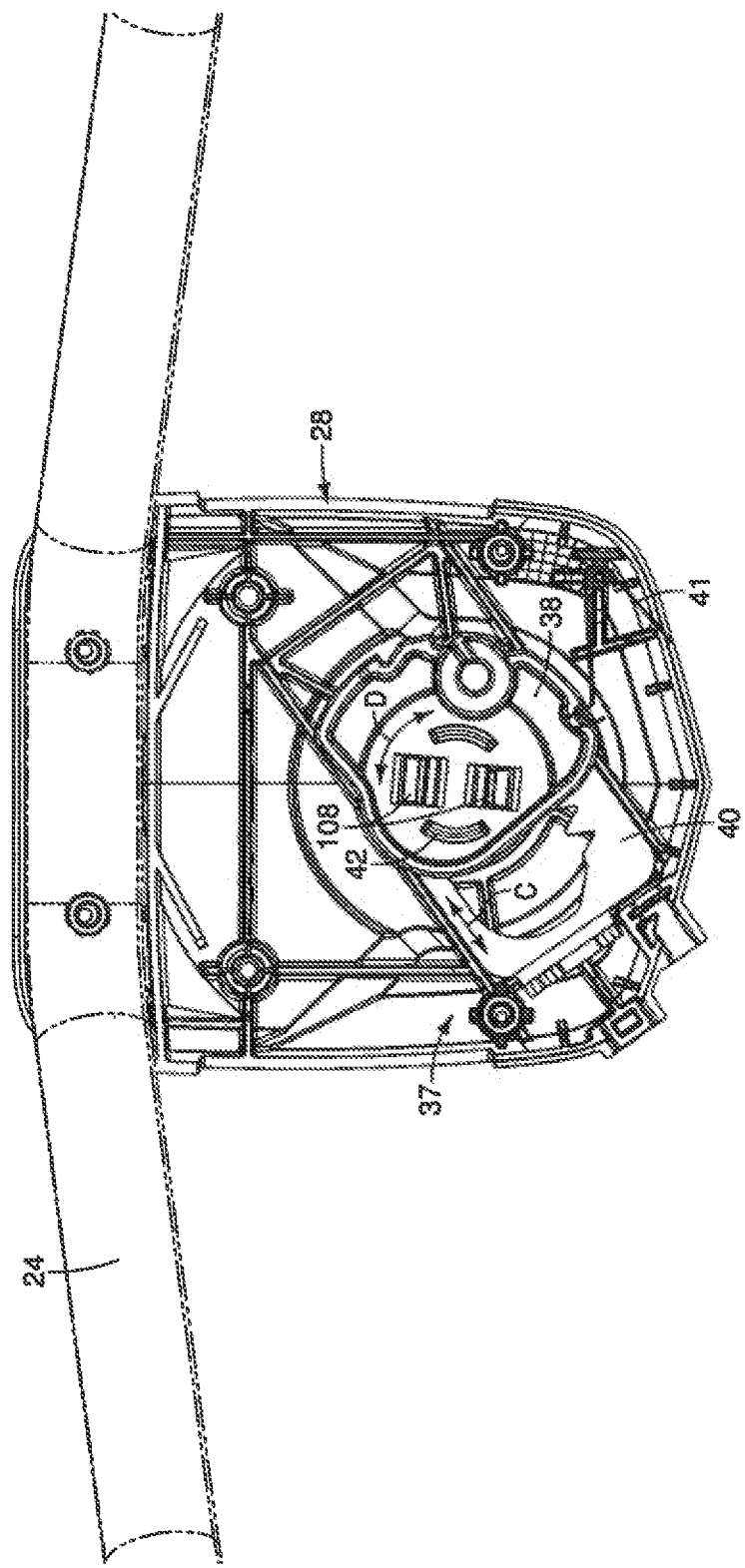

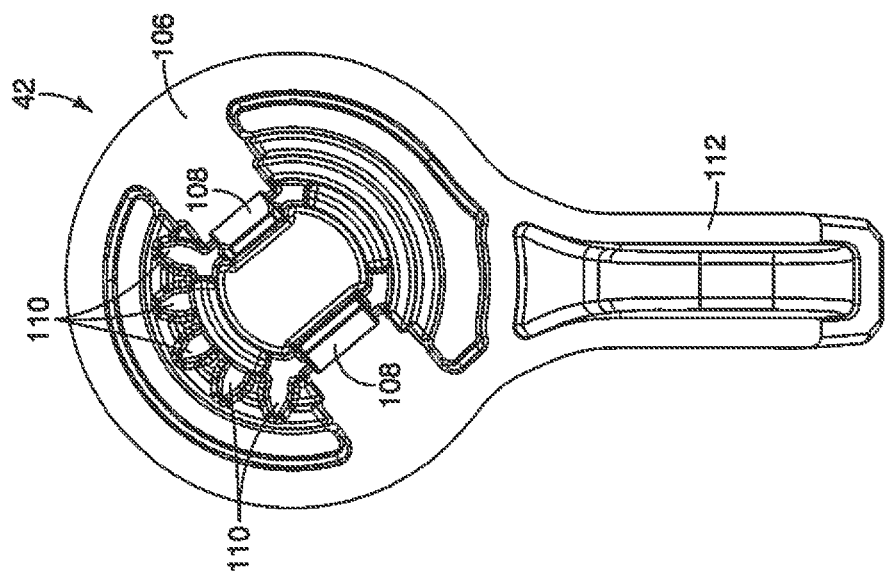
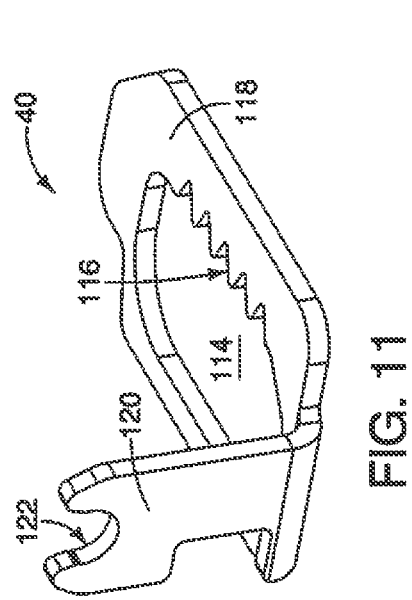
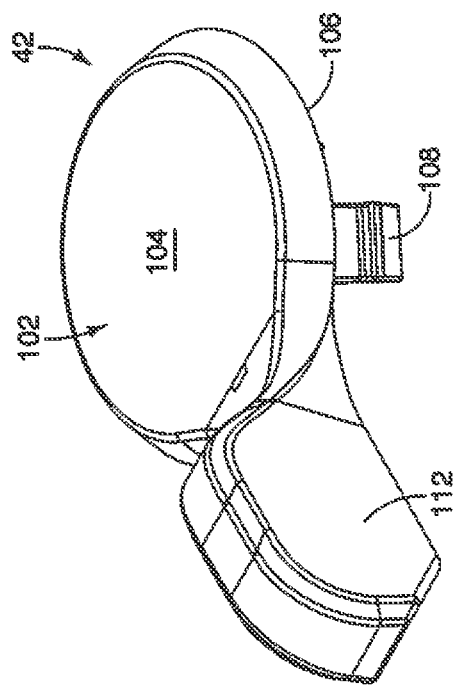

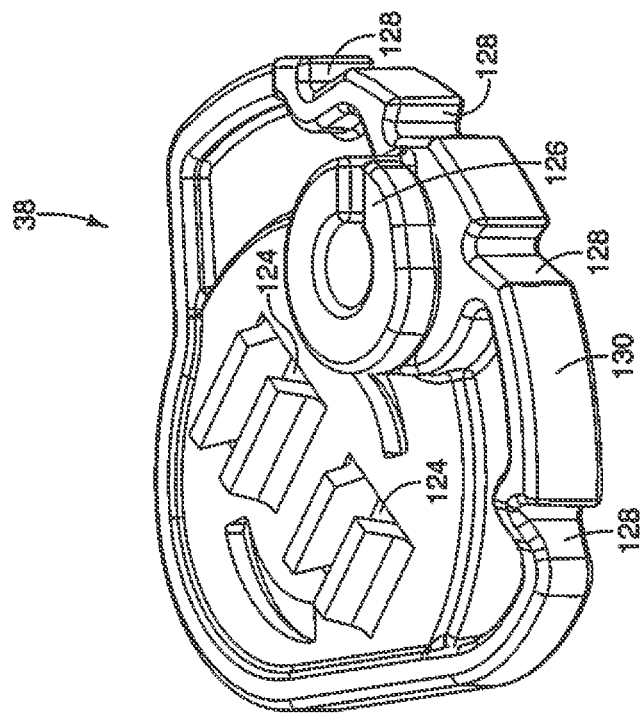
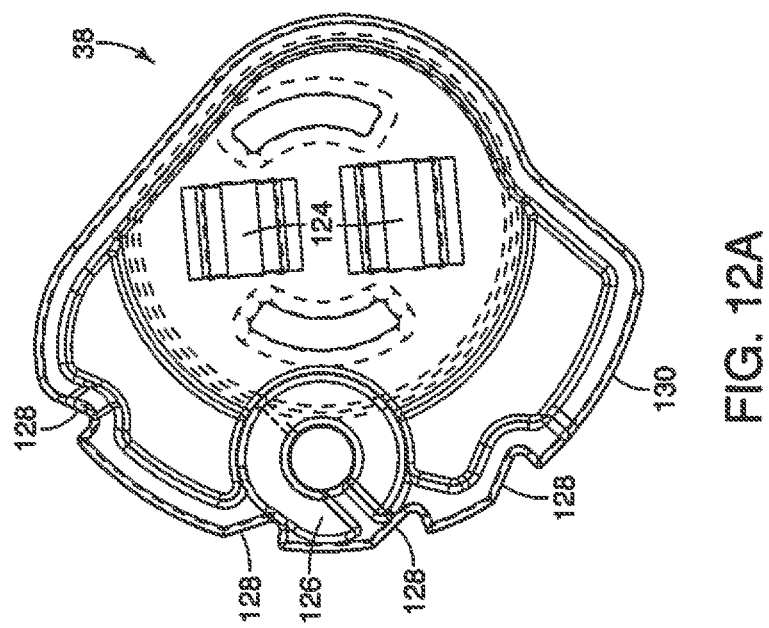
FIG. 12B
FIG. 12A

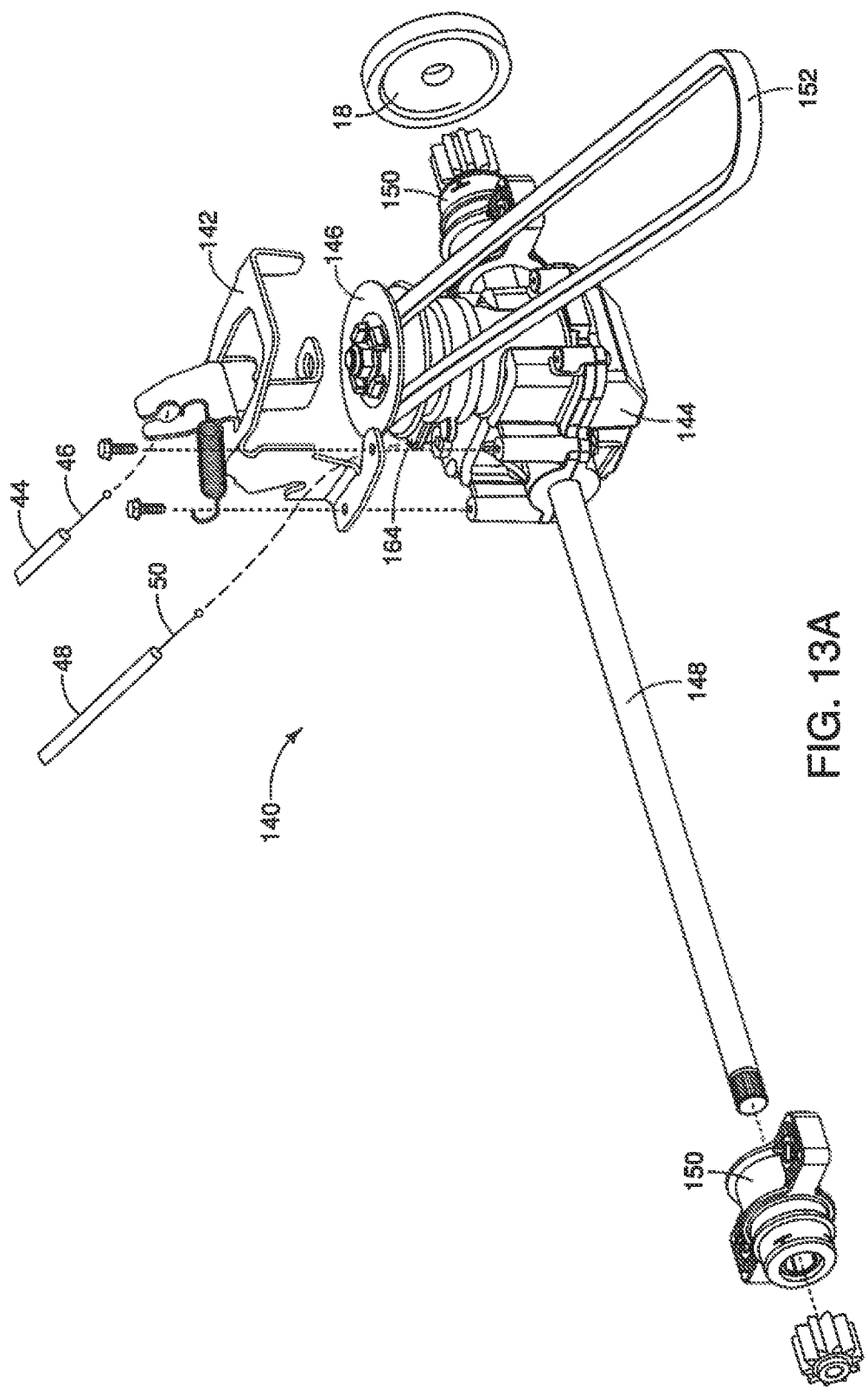

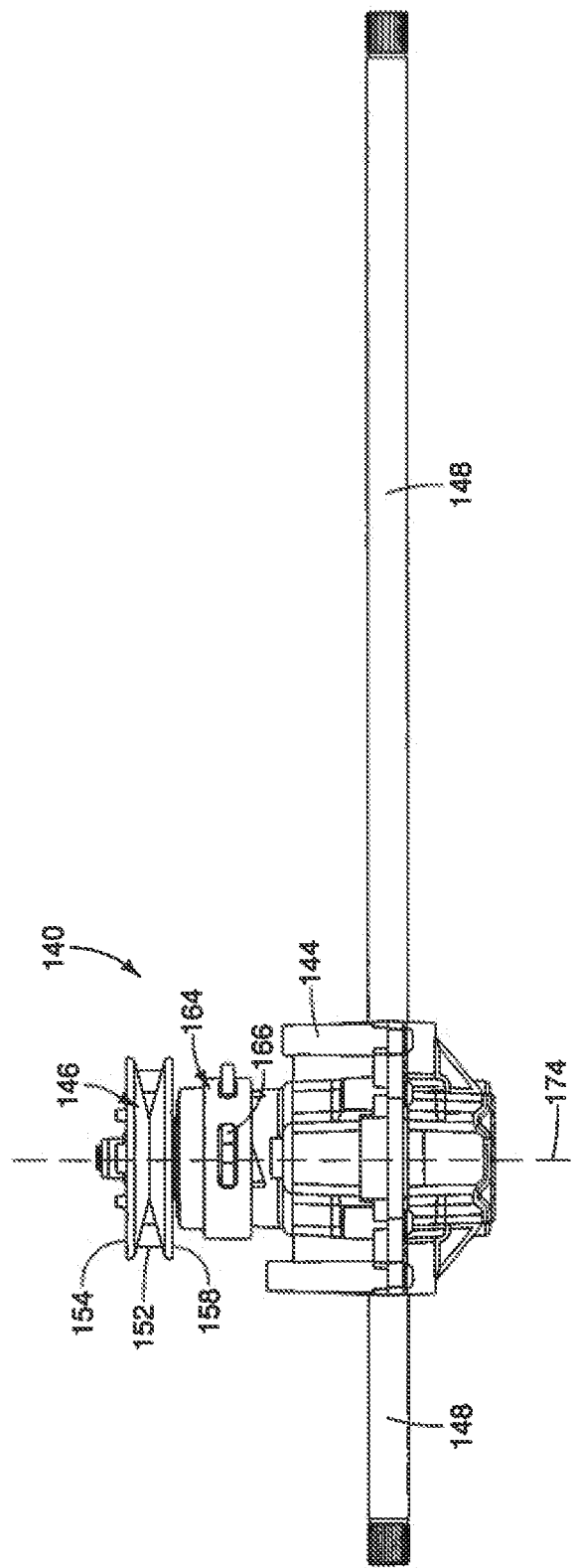

SPEED CONTROL ASSEMBLY FOR A SELF-PROPELLED WALK BEHIND LAWN MOWER

CROSS-REFERENCE TO RELATED APPLICATION

This application is a divisional application claiming priority benefit to U.S. patent application Ser. No. 13/250,209 filed Sep. 30, 2011, the entire contents of which are incorporated herein by reference.

BACKGROUND

1. Field of the Disclosure

The present disclosure relates to walk-behind lawn mowers, and more particularly, to a variable speed transmission and control assembly for a self-propelled lawn mower.

2. Description of Related Art

The propulsion of walk-behind lawn mowers has historically been operator-powered which required the operator to push the lawn mower around the yard. More recent walk-behind mowers have added self-propelled technology that typically includes a transmission that is powered by the primary engine, wherein the transmission is operatively connected to a pair of opposing wheels of the lawn mower to provide rotational power to those wheels so as to drive the mower. Generally, the self-propelled transmission is a single-speed transmission that is either engaged/on or disengaged/off. These single-speed self-propelled transmissions are typically controlled by an on/off switch or lever positioned on or near the cross-bar of the handle. These switches or levers may include, for example, a fore-aft adjustable lever on one leg of the handle, a rotatable bail that may operate independently or in conjunction with the safety bail, or a trigger-like mechanism, wherein actuation of the switches or levers causes the transmission to become engaged such that the transmission powers the wheels of the lawn mower.

These single-speed self-propelled transmissions for walk-behind mowers are often difficult to effectively use by an operator for several reasons. For example, the speed generated by the transmission to the wheels may cause the lawn mower to travel at a speed that can be too fast or too slow for the operator. As such, if the propelled speed is too slow, the operator ends up providing the pushing force. On the other hand, if the propelled speed is too fast, the operator ends up being dragged along by the lawn mower. In either situation, transmission often cannot be optimized for each individual operator. Alternatively, when an operator approaches an object such as a tree, house, sidewalk, posts, or the like, the operator often desires to slow down to make turns or navigate the lawn mower around these obstacles, but the self-propelled transmission being engaged causes the lawn mower to proceed at the same speed which can make avoiding obstacles more difficult.

Therefore, a need exists for a multiple speed control mechanism for adjusting the speed of the self-propelled transmission between a plurality of different speeds. A need also exists for a convenient and ergonomic speed control assembly that allows independent actuation of the self-propelled transmission by either hand of the operator while also adjusting the speed level.

SUMMARY

According to one aspect of the present disclosure, a transmission assembly for a self-propelled walk-behind lawn mower is provided. The transmission assembly includes a housing. The transmission assembly also includes a first pulley rotatably driven by a belt extending between the first pulley and an engine. The first pulley is connected to the housing. The first pulley has an upper pulley member, a lower pulley member, and an effective diameter directly relating to a distance the upper pulley member is spaced apart from the lower pulley member. One of the upper or lower pulley members is translatable relative to the other of the upper or lower pulley members. The transmission assembly further includes a drive shaft partially disposed within the housing. The drive shaft is operatively coupled to the first pulley, wherein rotation of the first pulley is transferred into rotation of the drive shaft to produce a rotational output of the drive shaft to drive a pair of ground-engaging wheels when the housing is in an engaged position. Translation of one of the pulley members relative to the other of the pulley members changes the distance between the upper and lower pulley members. The change in the distance changes the effective diameter of the first pulley which results in a change of speed of the rotational output of the drive shaft. Movement of the housing selectively actuates the housing between an engaged position and a disengaged position.

In another aspect of the present disclosure, a transmission assembly for a self-propelled walk-behind lawn mower is provided. The transmission assembly includes a housing. The transmission assembly also includes a first pulley rotatably driven by a belt extending between the first pulley and an engine. The first pulley is connected to the housing. The first pulley has an upper pulley member, a lower pulley member, and an effective diameter. The effective diameter directly relates to a distance the upper pulley member is spaced apart from the lower pulley member. The lower pulley member is translatable relative to the upper pulley member. The transmission assembly further includes a drive shaft partially disposed within the housing. The drive shaft is operatively coupled to the first pulley wherein rotation of the first pulley is transferred into rotation of the drive shaft to produce a rotational output of the drive shaft to drive a pair of ground-engaging wheels when the housing is in an engaged position. A change in the effective diameter results in a change of speed of the rotational output of the drive shaft. Movement of the housing selectively actuates the housing between the engaged position and a disengaged position. The transmission assembly still further includes a speed control assembly. The speed control assembly includes a casing and a knob rotatably connected to the casing. The knob is rotatable between a plurality of operative positions which causes translation of the lower pulley member relative to the upper pulley members for changing the distance therebetween. The speed control assembly also includes an indexer positioned within the casing. The indexer is operatively connected to the knob, wherein rotation of the knob causes translational movement of the indexer. Each of the plurality of operative positions produces a different relative speed of rotational output of the drive shaft. The knob is operatively connected to the lower pulley member. Rotation of the knob translates the lower pulley member relative to the upper pulley member to change the effective diameter of the first pulley.

Advantages of the present disclosure will become more apparent to those skilled in the art from the following description of the embodiments of the disclosure which have been shown and described by way of illustration. As will be realized, the disclosure is capable of other and different embodiments, and its details are capable of modification in various respects.

BRIEF DESCRIPTION OF SEVERAL VIEWS OF THE DRAWINGS

These and other features of the present disclosure, and their advantages, are illustrated specifically in embodiments of the disclosure now to be described, by way of example, with reference to the accompanying diagrammatic drawings, in which:

FIG. 6A is a top view of a lower housing;

FIG. 6B is a perspective view of the lower housing shown in FIG. 6A;

FIG. 7A is a perspective view of a first lever;

FIG. 7B is a plan view of the first lever shown in FIG. 7A;

FIG. 8A is a plan view of a second lever;

FIG. 8B is a perspective view of the second lever shown in FIG. 8A;

FIG. 9 is a top view of a speed adjustment assembly;

FIG. 10A is a perspective view of a knob;

FIG. 10B is a plan view of the knob shown in FIG. 10A;

FIG. 11 is a perspective view of an indexer;

FIG. 12A is a plan view of a cam;

FIG. 12B is a perspective view of the cam shown in FIG. 12A;

FIG. 13A is an exploded view of an exemplary embodiment of a transmission assembly;

FIG. 13B is a front view of the transmission assembly shown in FIG. 13A;

Figure 1:
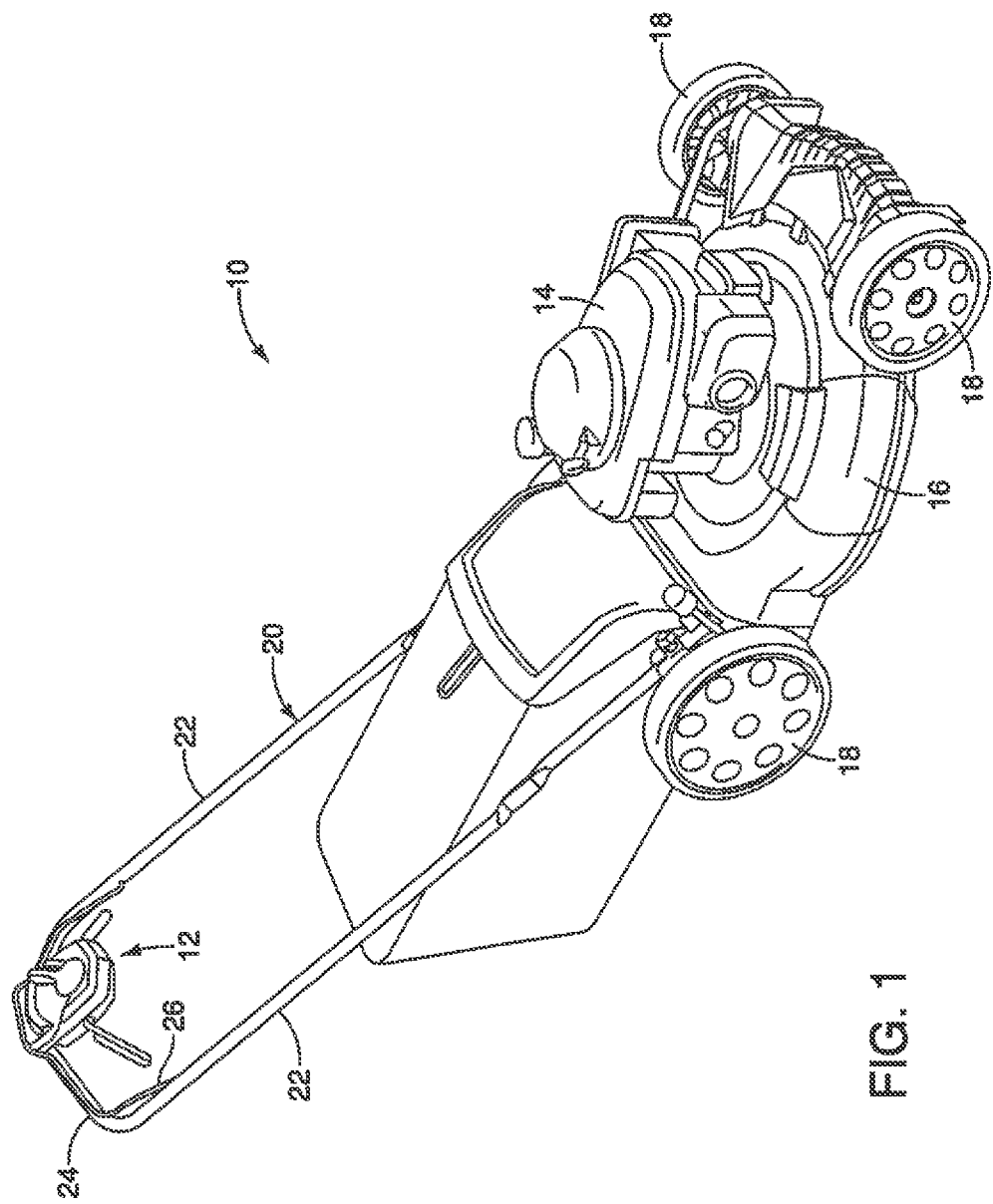
FIG. 1 is a perspective view of an embodiment of a self-propelled walk-behind lawn mower with a speed control assembly.

It should be noted that all the drawings are diagrammatic and not drawn to scale. Relative dimensions and proportions of parts of these figures have been shown exaggerated or reduced in size for the sake of clarity and convenience in the drawings. The same reference numbers are generally used to refer to corresponding or similar features in the different embodiments. Accordingly, the drawing(s) and description are to be regarded as illustrative in nature and not as restrictive.

DETAILED DESCRIPTION

Referring to FIG. 1, an exemplary embodiment of a self-propelled walk-behind lawn mower 10 having a speed control assembly 12 attached thereto is shown. The lawn mower 10 includes an engine 14 that powers a rotating blade assembly (not shown) for cutting grass, and the engine 14 is mounted on a deck or platform 16. A plurality of wheels 18 are attached to the deck 16, and at least a pair of the wheels 18 are configured to be selectively self-propelled by a transmission assembly, as will be described below.

A handle 20 extends from the rear portion of the deck 16, and the handle 20 includes a pair of elongated and substantially parallel side legs 22 having a cross bar 24 extending between the side legs 22, as shown in FIG. 1. In an embodiment, a safety bail 26 is rotatably connected to the opposing side legs 22 and is rotatable between a first position and a second position, wherein when the safety bail 26 is in the second position the engine can be started and remain running.

Figure 2:
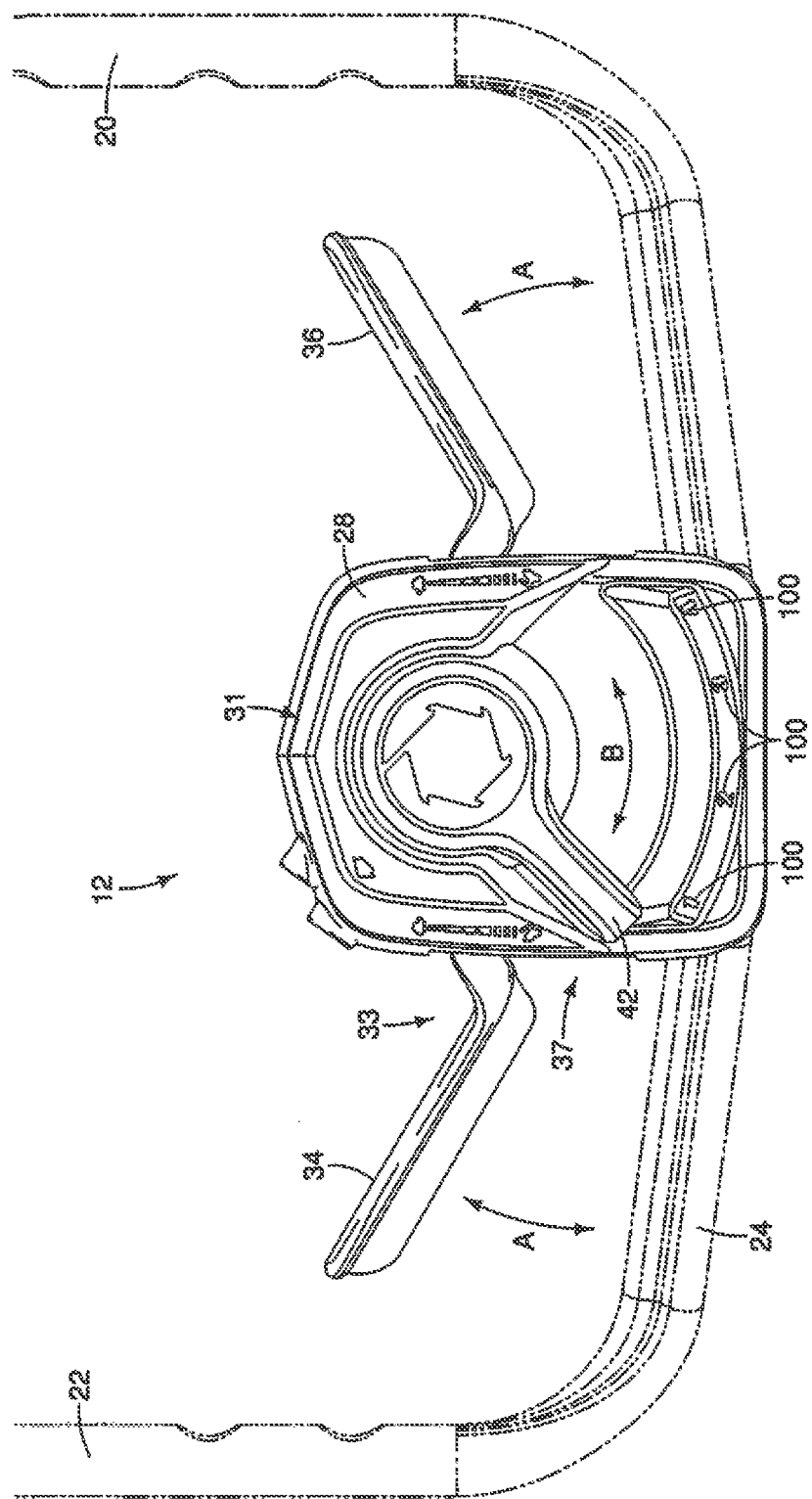
FIG. 2 is a top view of an embodiment of a speed control assembly.
Figure 3:
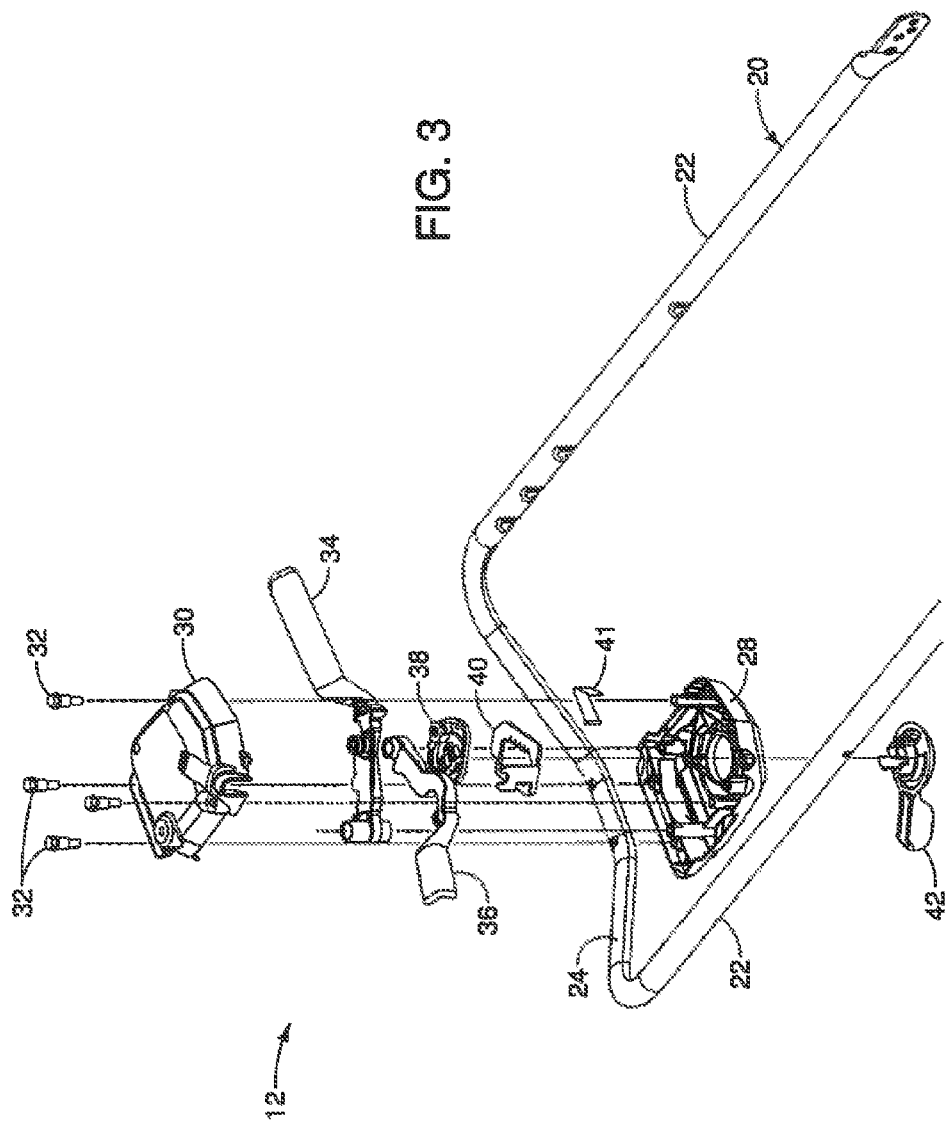
FIG. 3 is an exploded view of the speed control assembly shown in FIG. 2.

FIGS. 2-3 illustrate an exemplary embodiment of the speed control assembly 12. The speed control assembly 12 is operatively connected to the cross bar 24 of the handle 20. In an embodiment, the speed control assembly 12 includes an upper housing 28 and a lower housing 30 which are both attachable to each other to form a casing 31 that surrounds a portion of the cross bar 24. A plurality of attachment mechanisms 32, such as bolts, screws, or the like, are inserted through apertures or bosses formed in the lower housing 30, passing through holes in the cross bar 24, and received in corresponding apertures or bosses formed in the upper housing 28 to secure the upper and lower housing 28, 30 together while also attaching the entire speed control assembly 12 to the handle 20. The upper and lower housings 28, 30 are attached to the handle 20 in fixed manner such that the casing 31 does not move or rotate relative to the cross bar 24.

Figure 4:
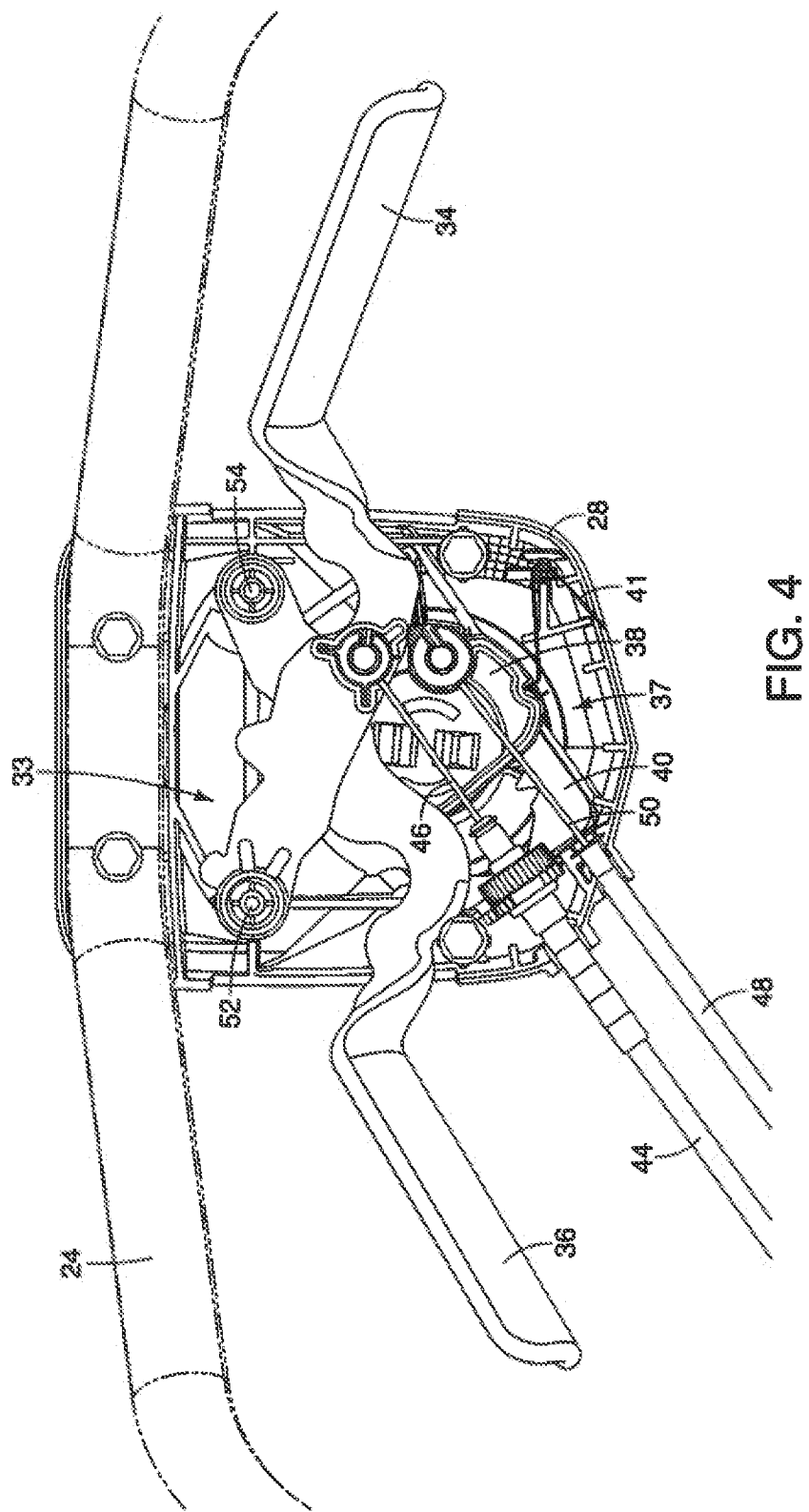
FIG. 4 is a bottom view of a portion of the speed control assembly shown in FIG. 2.

FIGS. 2-4 illustrate an exemplary embodiment of a speed control assembly 12 that includes a speed engagement assembly 33 and a speed adjustment assembly 37. The speed engagement assembly 33 includes a first lever 34 and a second lever 36 for selectively actuating the transmission assembly between an engaged state and a disengaged state. The speed adjustment assembly 37 includes a cam 38, an indexer 40, an indexing spring 41, and a knob 42, wherein the knob 42 is rotatable to selectively switch the output speed of the transmission assembly between a plurality of different relative speeds when the transmission assembly is in the engaged state. The first and second levers 34, 36 are configured to be rotatable relative to the upper and lower housings 28, 30 for engaging and disengaging the transmission assembly, as will be discussed below. In particular, the first and second levers 34, 36 are rotatable in the direction indicated by the arrows A shown in FIG. 2. The knob 42 is likewise rotatable relative to the upper housing 28 to adjust the relative output speed of the transmission assembly, as will be discussed below. In particular, the knob 42 is rotatable in the direction indicated by the arrow B shown in FIG. 2. The knob 42 is shown and described in the exemplary embodiment of the speed adjustment assembly 37 as the mechanism for switching the transmission assembly between different speeds, but it should be understood by one of ordinary skill in the art that any other switching mechanism, such as a lever, toggle, slide bar, button(s), or the like can also be used as the switching mechanism, and the term "knob" will be used as a general term to represent any type of switching mechanism.

Figure 5B:
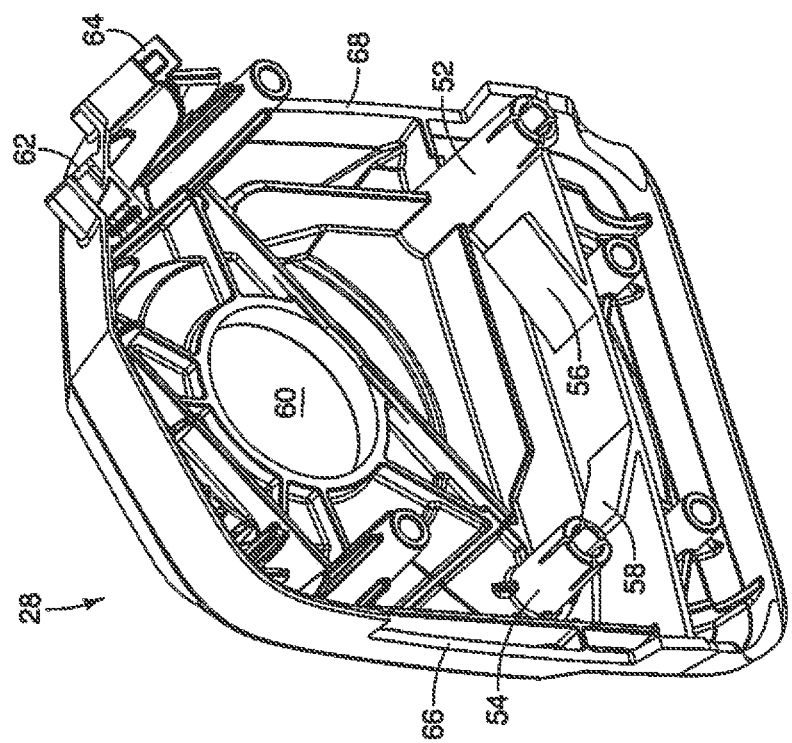
FIG. 5B is a perspective view of the upper housing shown in FIG. 5A.
Figure 5A:
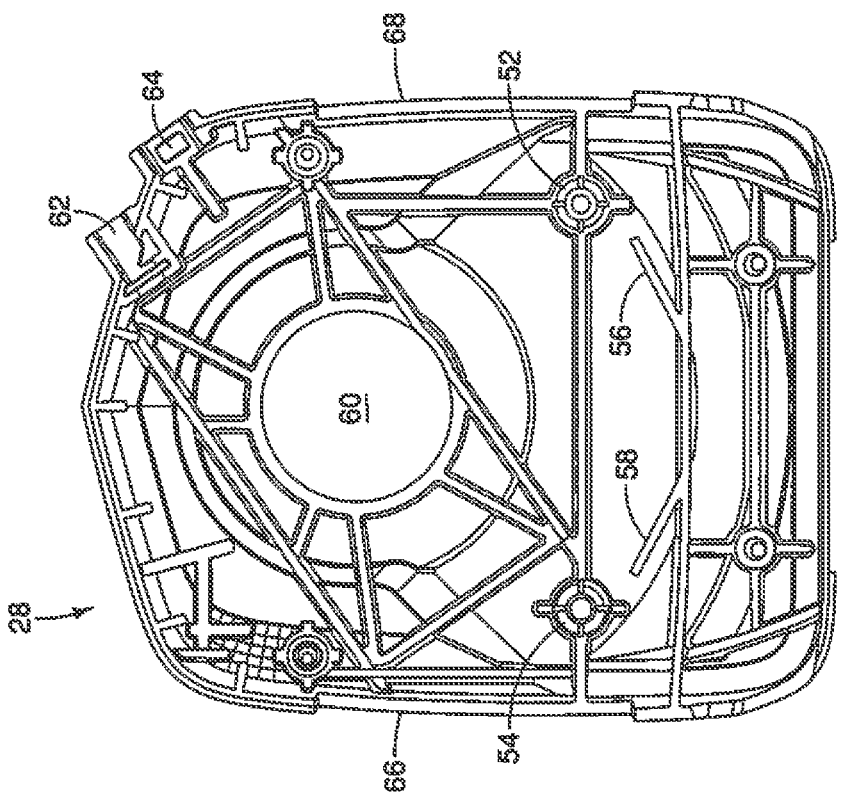
FIG. 5A is a bottom view of an upper housing.

FIGS. 5A-5B illustrate an exemplary embodiment of an upper housing 28. The upper housing 28 includes a first projection 52, a second projection 54, a first spring 56, a second spring 58, an aperture 60, a first conduit outlet 62, a second conduit outlet 64, a first slot 66, and a second slot 68. The first and second projections 52, 54 are elongated members that extend from the upper housing 28 and are configured to be operatively connected to the first and second levers 34, 36, respectively. The first and second springs 56, 58 are cantilevered projections that extend from the upper housing 28 and are configured to bias the first and second levers 34, 36 toward a first operative position, or a disengaged position, in which the first and second levers 34, 36 are spaced-apart from the cross bar 24. The first and second springs 56, 58 are integrally formed with the upper housing 28. The aperture 60 formed into the upper housing 28 is configured to receive the knob 42 that adjusts the speed of the transmission assembly when rotated. The first and second conduit outlets 62, 64 are configured to receive a first conduit 44 and a second conduit 48 (best seen in FIGS. 4 and 13A). The end of the first conduit 44 is attached to the indexer 40 and the end of a first wire 46 is attached to the first lever 34 (FIG. 4), whereas the end of the second conduit 48 is fixedly attached to the casing 31 and the end of a second wire 50 (FIG. 4) is attached to the cam 38. The first and second slots 66, 68 are formed in the side edges of the upper housing 28 to allow the first and second levers 34, 36 to extend laterally outward from the casing 31 through these slots.

The lower housing 30, as shown in FIGS. 6A-6B, is attachable to the upper housing 28 to form the casing 31 of the speed control assembly 12 that is attachable to the handle 20. The lower housing 30 includes a first slot 66', a second slot 68', a first projection 52', a second projection 54', a first conduit outlet 62', and a second conduit outlet 64'. The first and second slots 66', 68' of the lower housing 30 cooperate with the corresponding first and second slots 66, 68 of the upper housing 28 to provide a hole or aperture through both opposing side edges of the assembled casing 31 to allow the first and second levers 34, 36 to extend therefrom and rotate relative thereto. The first and second projections 52', 54' of the lower housing 30 are received within the ends of corresponding first and second projections 52, 54 of the upper housing 28, respectively, when the upper and lower housings 28, 30 are assembled to form the casing 31. The first and second conduit outlets 62', 64' of the lower housing 30 cooperate with the corresponding first and second conduit outlets 62, 64 of the upper housing 28 to receive the first and second conduits 44, 48 therein. In an embodiment, the upper and lower housings 28, 30 are molded plastic members that are attachable to each other to form the casing 31 of the speed control assembly 12. It should be understood by one of ordinary skill in the art that the upper and lower housings 28, 30 can be formed of any material sufficient to provide the necessary structural elements for receiving the components positioned therewithin.

In an embodiment, the first lever 34 of the speed control assembly 12 is an elongated member that is rotatable relative to the casing 31 about a first axis 70, as shown in FIGS. 7A-7B. The first lever 34 is both independently and dependently actuatable relative to the casing 31. The first lever 34 can be formed of molded plastic, metal, or any other material sufficient to withstand repeated gripping actuation by an operator as well as the environmental conditions during use as well as during off-season storage. The first lever 34 includes a central body 71 having a lower surface 72, an upper surface 74, and a grip 76 extending from the central body 71 as well as an attachment boss 78, a first boss 80, an actuator 82, and a first positioning member 84. The first lever 34 is operatively connected to the upper housing 28 by positioning the attachment boss 78 of the first lever 34 about the first projection 52 (FIG. 4). The attachment boss 78 is an elongated, substantially cylindrical member that extends away from both the lower and upper surfaces 72, 74 of the first lever 34. The attachment boss 78 forms a hollow passageway that is sized and shaped to correspond to the outer surface of the first projection 52 of the upper housing 28 such that the first lever 34 forms a fit with the upper housing 28 while still being able to rotate about the first axis 70.

The grip 76 of the first lever 34 extends from the end of the central body 71 opposite the attachment boss 78, as shown in FIGS. 7A-7B. The grip 76 forms a curved portion, wherein the curved inner surface of the grip 76 has a shape that corresponds to the shape of the cross bar 24 of the handle 20 such that when an operator actuates the first lever 34 the curved inner surface can be positioned immediately adjacent to or abutting the cross bar 24. The first lever 34 is configured such that the grip 76 extends laterally from the casing 31 through the first slot 66.

As illustrated in FIGS. 7A-7B, the first boss 80 extends from the lower surface 72 of the central body 71. The first boss 80 is a substantially cylindrical member configured to receive one end of the first wire 46. The distance between the first boss 80 and the attachment boss 78 remains constant such that rotation of the first lever 34 causes the first boss 80 to move relative to the end of the first conduit 44, wherein movement of the first boss 80 relative to the end of the first conduit 44 results in the first wire 46 to either extend from or retract into the first conduit 44 (FIG. 4).

The actuator 82 extends away from the upper surface 74 of the central body 71 of the first lever 34, as shown in FIGS. 7A-7B. The actuator 82 is formed as a substantially cylindrical member, but it should be understood by one of ordinary skill in the art that the actuator 82 can be sized and shaped in any manner. The actuator 82 is configured to contact the second lever 36, wherein the first lever 34 is rotated in response to actuation or rotation of the second lever 36 resulting from a camming action due to the contact between the actuator 82 and the second lever 36.

The first positioning member 84 of the first lever 34 extends from the central body 71 in a manner that is away from the upper surface 74, as shown in FIGS. 7A-7B. The first positioning member 84 cooperates with the first spring 56 of the upper housing 28 to bias the first lever 34 away from the cross bar 24 of the handle 20. The first positioning member 84 remains in substantially continuous contact with the first spring 56 that is integrally formed with the upper housing 28.

The second lever 36 is positioned between the first lever 34 and the upper housing 28, as shown in FIGS. 3-4. The second lever 36 of the speed control assembly 12 is an elongated member that is rotatable relative to the casing 31 about a second axis 86, as shown in FIGS. 8A-8B. The illustrated embodiment of the second lever 36 can be formed of molded plastic, metal, or any other material sufficient to withstand repeated gripping actuation by an operator as well as the environmental conditions during use as well as during off-season storage. The second lever 36 includes a central body 88 having an upper surface 90, a lower surface 92, and a cam surface 93, and a grip 94 extending from the central body 88, an attachment boss 96, and a second positioning member 98. The second lever 36 is operatively connected to the upper housing 28 by positioning the attachment boss 96 of the second lever 36 about the second projection 54 (FIG. 4). The attachment boss 96 is an elongated, substantially cylindrical member that extends away from the upper surfaces 90 of the central body 88. The attachment boss 96 forms a hollow passageway that is sized and shaped to correspond to the outer surface of the second projection 54 of the upper housing 28 such that the second lever 36 forms a fit with the upper housing 28 while still being able to rotate about the second axis 86.

The grip 94 of the second lever 36 extends from the end of the central body 88 opposite the attachment boss 96, as shown in FIGS. 8A-8B. The grip 94 forms a curved portion, wherein the curved inner surface of the grip 94 has a shape that corresponds to the shape of the cross bar 24 of the handle 20 such that when an operator actuates the second lever 36 the curved inner surface can be positioned immediately adjacent to or abutting the cross bar 24. The second lever 36 is configured such that the grip 94 extends laterally from the casing 31 through the second slot 68 opposite the first lever 34.

The cam surface 93 extends between the upper and lower surfaces 90, 92 of the central body 88 of the second lever 36, as shown in FIGS. 8A-8B. The cam surface 93 is configured to contact the actuator 82 of the first lever 34 such that actuation or rotation of the second lever 36 toward the cross bar 24 causes the actuator 82 of the first lever 34 to slide along the cam surface 93 of the second lever 36, thereby resulting in corresponding actuation or rotation of the first lever 34. Accordingly, the first lever 34 is also dependently rotatable relative to the casing 31 when the second lever 36 is rotated toward the handle 20.

The second positioning member 98 of the second lever 36 extends from the central body 88 in an adjacent manner, as shown in FIGS. 8A-8B. The second positioning member 98 cooperates with the second spring 58 (FIGS. 4-5B) of the upper housing 28 to bias the second lever 36 away from the cross bar 24 of the handle 20. The second positioning member 98 remains in substantially continuous contact with the second spring 58 that is integrally formed with the upper housing 28.

FIG. 9 illustrates an embodiment of a speed adjustment assembly 37 that is configured to selectively control the relative speed of the lawn mower 10. The speed adjustment assembly 37 includes the rotatable knob 42 (FIG. 2) that is operatively connected to the cam 38 which is connected to the second wire 50 (FIGS. 4 and 13A). The knob 42 is also operatively connected to the indexer 40 in a rack-and-pinion-type connection in which rotational movement of the knob 42 is converted into translational movement of the indexer 40. The indexer 40 is operatively connected to the first conduit 44 for adjusting the relative position of the end of the first conduit 44 with respect to the casing 31.

With reference to FIGS. 10A-10B, an exemplary embodiment of a knob 42 of the speed adjustment assembly 37 is shown. In an embodiment, the knob 42 is formed of molded plastic. The knob 42 includes a substantially round central body 102 having a top surface 104 and a bottom surface 106. The knob 42 is positioned relative to the casing 31 such that the top surface 104 is directed away from the upper housing 28 (FIG. 2), and the bottom surface 106 is positioned immediately adjacent to the upper housing 28. In an embodiment, a pair of tabs 108 extend from the bottom surface 106. The tabs 108 are configured to couple the knob 42 to the cam 38. In another embodiment, three tabs 108 extend from the bottom surface 106 of the knob for coupling the knob 42 to the cam 38. It should be understood by one of ordinary skill in the art that any number of tabs 108 can extend from the bottom surface 106 to provide a coupling mechanism between the knob 42 and the cam 38. In yet another embodiment, the knob 42 and the cam 38 can be integrally formed as a single member.

In addition to the tabs 108, a plurality of indexing pins 110 extending from the bottom surface 106 of the knob 42, as shown in FIG. 10B. The indexing pins 110 are positioned between the tabs 108. The indexing pins 110 are positioned adjacent to each other in an arcuate alignment and are directed radially outward from the center of the central body 102 of the knob 42. In an embodiment, the knob 42 includes five (5) indexing pins 110, but it should be understood by one of ordinary skill in the art that the knob 42 may include any number of indexing pins 110. The five indexing pins 110 are positioned such that each indexing pin 110 is oriented between about 2°-45° relative to the adjacent indexing pin 110. In an embodiment, the indexing pins 110 are oriented about 24° relative to the adjacent indexing pin 110. It should be understood to one of ordinary skill in the art that the indexing pins 110 can be oriented at any angle relative to each other so as to provide a pinion-like engagement with the rack 116 (FIG. 11) of the indexer 40.

As illustrated in FIGS. 10A-10B, a grip 112 extends from the central body 102 of the knob 42. The grip 112 aligned radially outward from the central body 102, which allows an operator to grasp the grip 112 and rotate the knob 42 relative to the casing 31 wherein such rotation selectively changes the relative speed of the transmission assembly 140 (FIGS. 13A-14B). The speed control assembly 12 is configured such that the range of movement of the grip 112 of the knob 42 is between about 45°-180°. In an embodiment, the grip 112 is rotatable between a plurality of operative positions, as will be explained below. In another embodiment, the grip 112 is rotatable between an infinite quantity of operative positions. Rotational motion of the knob 42 generates translational motion of the indexer 40.

An exemplary embodiment of an indexer 40 of the speed adjustment assembly 37 is illustrated in FIG. 11. In an embodiment, the indexer 40 is formed of metal. However, it should be understood by one of ordinary skill in the art that the indexer 40 can be formed of any material sufficient to provide low friction between the indexer 40 and the upper housing 28 as well as between the indexer 40 and the cam 38. The indexer 40 is an L-shaped member that is positioned between the cam 38 and the upper housing 28. The indexer 40 includes an aperture 114 that forms a rack 116 in the base 118. The rack 116 includes a plurality of projections and indentations, wherein the quantity of indentations should be at least the same quantity of indexing pins 110 formed on the knob 42. In the exemplary embodiment, the rack 116 includes four (4) projections and five (5) indentations. When assembled, each indentation of the rack 116 is configured to receive a corresponding indexing pin 110 of the knob 42.

The illustrated embodiment of the indexer 40, as shown in FIG. 11, includes an arm 120 extending from the base 118 at an angle relative thereto. In an embodiment, the arm 120 is oriented substantially perpendicular relative to the base 118. In another embodiment the arm 120 is oriented at a non-normal angle relative to the base 118. A catch 122 is positioned at the end of the arm 120 opposite the base 118. The catch 122 is a detent, or cut-out, formed at the end of the arm 120 configured to receive an end of the first conduit 44. The end of the first conduit 44 received in the catch 122 may be formed as a z-fitting, a barrel fitting, a spherical fitting, or any other fitting sufficient to allow the end of the first conduit 44 be received by the catch 122. The indexer 40 is configured to translate in a substantially linear motion, as indicated by arrow C in FIG. 9. Translation of the indexer 40 relative to the upper housing 28 causes the catch 122 to move toward and away from the second conduit outlet 64, thereby causing the end of the first conduit 44 attached to the catch 122 to translate toward and away from the second conduit outlet 64 in a like manner.

The knob 42 of the speed adjustment assembly 37 is also operatively connected to the cam 38, wherein the tabs 108 of the knob 42 are configured to secure the cam 38 to the knob 42, as shown in FIG. 9. Due to the attachment of the cam 38 to the knob 42, rotation of the knob 42 results in corresponding rotation of the cam 38, as shown by arrow D. An exemplary embodiment of the cam 38, as illustrated in FIGS. 12A-12B, includes a pair of apertures 124 formed through the thickness thereof. The apertures 124 are configured to receive the tabs 108 of the knob 42 to provide a positive engagement between the knob 42 and the cam 38. In an embodiment, the apertures 124 formed in the cam 38 are of different widths, and the tabs 108 of the knob 42 are likewise of similar corresponding and different widths. The different widths of the apertures 124 of the cam 38 ensure proper alignment of the cam 38 relative to the knob 42 during assembly.

As shown in FIGS. 12A-12B, the cam 38 also includes a second boss 126 extending upwardly from the surface of the cam 38 directed away from the indexer 40. The second boss 126 is configured to receive the end of the second wire 50 (FIG. 4) to provide an operative connection between the cam 38 and the second wire 50, wherein rotation of the cam 38 causes the second wire 50 to be extended and retracted relative to the second conduit 48.

The exemplary embodiment of the cam 38 further includes a plurality of notches 128 formed into a lateral edge 130 of the cam 38, as shown in FIGS. 12A-12B. The notches 128 are indentations toward the center of the cam 38 to provide an indexing mechanism wherein each of the notches 128 provides a different operational position of the knob 42 that is attached to the cam 38 as the cam 38 is rotated. The notches 128 are configured to receive the indexing spring 41 (FIG. 4). When the knob 42 is in a speed selector position, the spring 41 is positively engaged with one of the notches 128, thereby securing the cam 38 at a position corresponding to the speed selector position of the knob 42. When an operator desires to change the speed of the lawn mower 10, the knob 42 is rotated, thereby rotating the cam 38. Such rotation causes the spring 41 to become disengaged from the cam 38 until the cam 38 has been rotated enough that the spring 41 becomes aligned with one of the notches 128, at which point the spring 41 is received in the notch 128 to again positively locate the cam 38 and the knob 42. In an embodiment, each of the notches 128 formed into the lateral edge 130 of the cam 38 corresponds to a speed selector position marking 100 (FIG. 2).

Figure 13C:
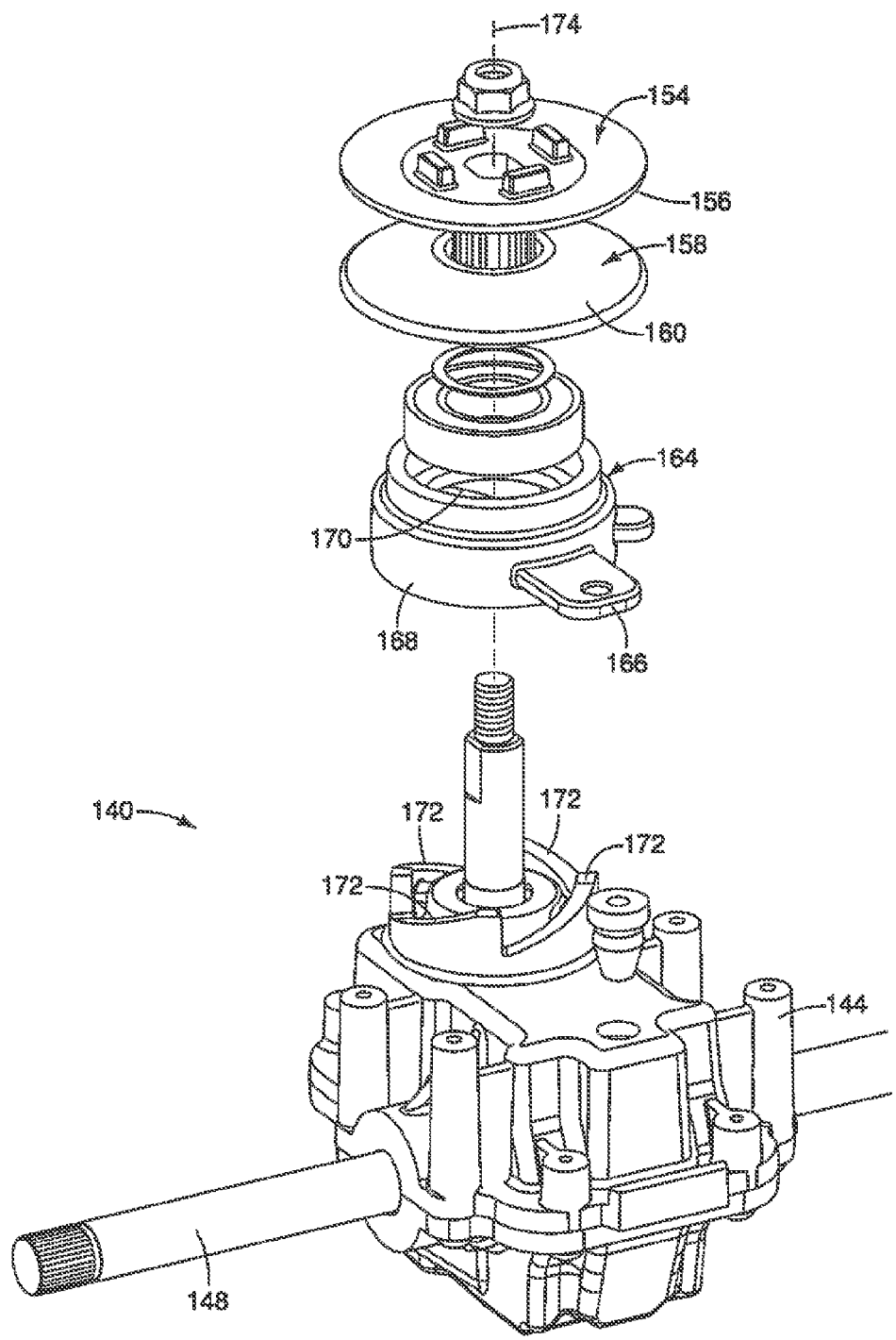
FIG. 13C is an exploded view of the transmission assembly shown in FIG. 13A.

The speed engagement assembly 33 described above is configured to selectively engage and disengage a multi-speed transmission assembly that provides rotational power to the wheels 18 of the lawn mower 10, and the speed adjustment assembly 37 is configured to selectively change the speed of the multi-speed transmission assembly when the transmission assembly is in the engaged state. FIGS. 13A-13C illustrates an exemplary embodiment of a multi-speed transmission assembly 140 configured to provide rotational power to a pair of opposing wheels 18 when selectively actuated by the first and second levers 34, 36 of the speed engagement assembly 33. The transmission assembly 140 is selectively rotatable in response to actuation of the first and second levers 34, 36. It should be understood by one of ordinary skill in the art that the adjustable speed transmission assembly 140 described herein is an exemplary embodiment and any other multi-speed transmission—including non-rotatable transmissions—can also be configured to be adjusted by the speed control assembly 12 described herein.

In an embodiment, the transmission assembly 140 includes a bracket 142 that is operatively connected to a housing 144 which has an adjustable first pulley 146 extending therefrom, as shown in FIGS. 13A-13B. The first pulley 146 is operatively connected to gear members (not shown) disposed within the housing 144 which are, in turn, connected to the drive shaft 148 that extends in opposing lateral directions from the housing 144. The rotation of the first pulley 146 is transferred to rotation of the drive shaft 148 by way of the gear members within the housing. It should be understood by one of ordinary skill in the art that the drive shaft 148 can be either a single member in which both ends of the drive shaft 148 rotate simultaneously or a two-piece assembly in which each section can rotate independent of the other. The drive shaft 148 extends along an axis that is substantially normal to the axis of rotation of the first pulley 146. The transmission assembly 140 is operatively attached to the deck 16 (FIG. 1) by way of opposing bearings 150.

The transmission assembly 140 is powered by the engine 14 by way of a v-shaped belt 152, as shown in FIGS. 13A-13B, which is configured to selectively provide rotational power to the transmission assembly 140. The belt 152 is configured to extend between and be in selective engagement with the first pulley 146 and an opposing pulley (not shown) directly powered by the engine 14, thereby operatively coupling the transmission assembly 140 to the engine 14. Rotation of the first pulley 146 about a substantially vertical axis by the engine 14 is transferred through the gears within the housing 144 to the drive shaft 148 about a substantially horizontal axis. When the transmission assembly 140 is in the disengaged state the belt 152 is slack between the opposing pulleys such that there is no power transmitted from the engine 14 to the transmission assembly 140, and when the transmission assembly 140 is in the engaged state, the belt 152 is taut between the opposing pulleys such that there is full transmission of rotational power between the engine 14 to the transmission assembly 140.

When the transmission assembly 140 is in the disengaged position, there is no rotational power transferred from the engine 14 due to slack in the belt 152 that connects the transmission assembly 140 to the engine 14. Similarly, when the transmission assembly is in the engaged position, there is a full transfer of rotational power from the engine 14 to the transmission assembly 140 due to the belt 152 being taut and the slack removed. In the exemplary embodiment of the transmission assembly 140 illustrated in FIGS. 13A-13C, the transmission assembly 140 is rotatable between a first operative position (or a disengaged position) and a second operative position (or an engaged position). In other words, rotation of the housing 144 and first pulley 146 of the transmission assembly 140 away from engine 14—from the disengaged position to the engaged position—increases the distance between the first pulley 146 and the corresponding engine pulley such that the slack in the belt 152 is removed. Similarly, rotation of the housing 144 and first pulley 146 of the transmission assembly 140 toward the engine 14—from the engaged position to the disengaged position—decreases the distance between the first pulley 146 and the corresponding engine pulley such that the belt 152 becomes slack which does not allow rotational power to be transferred between opposing pulleys.

This rotation of the transmission assembly 140 is accomplished by the first and second levers 34, 36 of the speed engagement assembly 33. The first and second levers 34, 36 are rotatable between a disengaged position and an engaged position, wherein the first and second levers 34, 36 are spaced apart from the cross bar 24 of the handle 20 when located in the disengaged position and the first and second levers 34, 36 are positioned immediately adjacent to the cross bar 24 when located in the engaged position. Rotation of either or both of the first and second levers 34, 36 to the engaged position causes the first boss 80 on the first lever 34 to rotate away from the first conduit outlet 62. Such rotation of the first boss 80 creates tension in the first wire 46, thereby pulling on the bracket 142 to rotate the transmission assembly 140 away from the engine 14 resulting in the slack in the belt 152 being removed and the transmission assembly 140 to be fully engaged with the engine 14 for transmission of rotational power therebetween. Rotation of the first and second levers 34, 36 to the disengaged position causes the first boss 80 to rotate toward the first conduit outlet 62, wherein the first wire 46 is retracted into the first conduit 44. As the first wire 46 is retracted, the transmission assembly 140 is rotationally biased toward the engine, thereby generating slack in the belt 152 and disengaging the transmission assembly 140 from the engine 14 so that no rotational power is transferred therebetween. It should be understood by one of ordinary skill in the art that the operator may "feather" the first and second levers 34, 36 between the disengaged position and the engaged position to partially engage the transmission assembly 140 and the engine 14 such that only a portion of the rotational power of the engine is transferred to the transmission assembly 140 due to slip of the belt 152 about the pulleys.

Figure 14B:
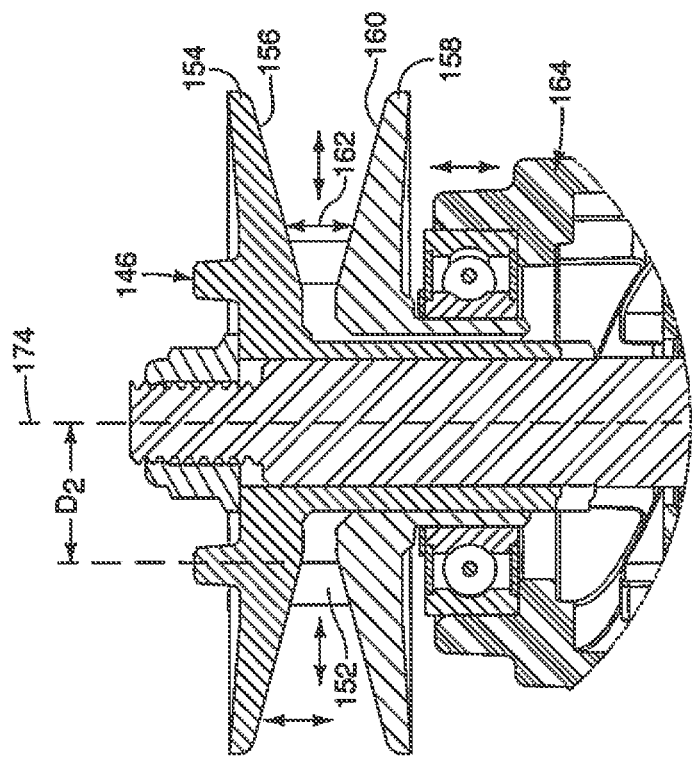
FIG. 14B is a cross-sectional diagram of a portion of the transmission assembly shown in FIG. 14A in a second operative position.
Figure 14A:
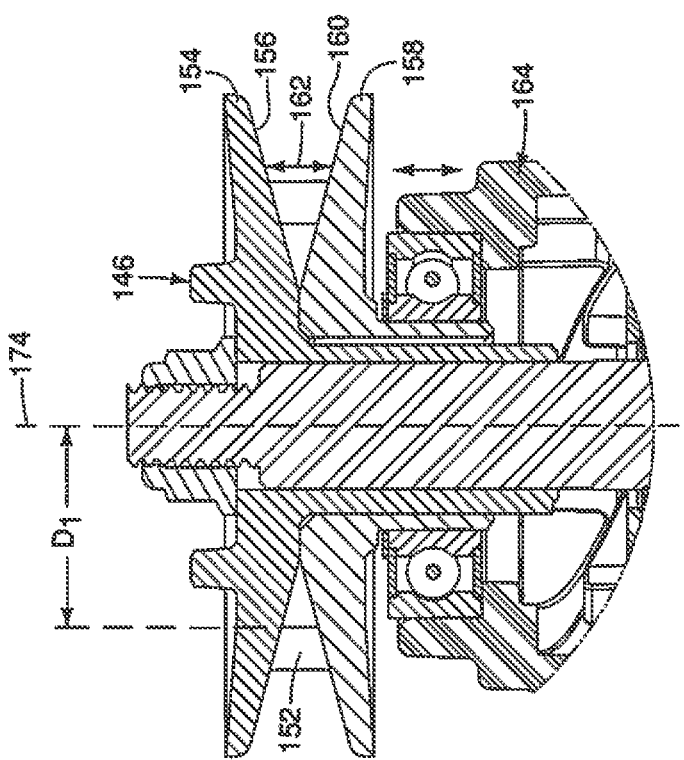
FIG. 14A is a cross-sectional diagram of a portion of the transmission assembly shown in FIG. 13A in a first operative position.

Once the transmission assembly 140 is in the engaged position, the operator can selectively adjust the speed output from the transmission assembly 140 to the wheels 18. In an embodiment, the first pulley 146 of the transmission assembly 140 includes a substantially fixed upper pulley member 154 having an upper bearing surface 156 and a translatable lower pulley member 158 having a lower bearing surface 160 with a gap 162 between the upper and lower bearing surfaces 156, 160, as shown in FIGS. 14A-14B. The lower pulley member 158 is moveable relative to the upper pulley member 154, whereas the upper pulley member 154 remains substantially fixed as it is operatively connected to the housing 144. The lower pulley member 158 is selectively positionable in a plurality of operative positions relative to the upper pulley member 154.

In the exemplary embodiment of the transmission assembly 140 shown in FIGS. 13A-13C, the transmission assembly 140 includes a rotatable actuator 164, and the actuator 164 is configured to selectively move the lower pulley member 158 relative to the upper pulley member 154. The actuator 164 includes a control tab 166 extending radially outward from the outer surface of the body 168. A plurality of first bearing surfaces 170 (partially shown in FIG. 13C) are directed downwardly and formed on the inner surface of the body 168. The first bearing surfaces 170 of the actuator 164 correspond to the second bearing surfaces 172 extending upwardly from the housing 144. The second bearing surfaces 172 remain substantially fixed with respect to the housing 144, whereas the first bearing surfaces 170 are rotatable relative to the second bearing surfaces 172 in response to the rotation of the actuator 164. The first and second bearing surfaces 170, 172 are slidingly engageable, and rotation of the actuator 164 results in corresponding translational movement of the actuator 164 relative to the housing 144 with respect to the rotational axis 174 of the first pulley 146. Because the actuator 164 is operatively connected to the lower pulley member 158, translational movement of the actuator 164 toward and away from the housing 144 causes corresponding translational movement of the lower pulley member 158 relative to the upper pulley member 154. Although the above description explains the change in output rotational speed resulting from the lower pulley member 158 being translatable relative to the upper pulley member 154, it should be understood by one of ordinary skill in the art that the transmission assembly 140 can be configured such that the upper pulley member 154 is translatable relative to a substantially fixed lower pulley member 158 to adjust the effective diameter of the first pulley 146.

The lower pulley member 158 is selectively positionable by rotating the knob 42 of the speed adjustment assembly 37. The knob 42 is attached to the cam 38, which is, in turn, operatively connected to an end of the second wire 50. Because the corresponding end of the second conduit 48 is attached to the casing 31 such that the conduit 48 remains substantially fixedly positioned, the second wire 50 is extended from and retracted into the second conduit 48 in response to rotation of the cam 38. The opposing end of the second conduit 48 is attached to the bracket 142 of the transmission assembly 140 and the corresponding end of the second wire 50 is operatively connected to a control tab 166 of the actuator 164. Rotation of the knob 42 causes the second wire 50 to be extended from or retracted into the second conduit 48, wherein the end of the second wire 50 causes the actuator 164 of the transmission assembly 140 to rotate about the axis 174, thereby resulting in the first bearing surfaces 170 to slide relative to the second bearing surfaces 172 and the actuator 164 to translate relative to the housing 144 which causes the lower pulley member 158 to translate relative to the upper pulley member 154, and such translation of the lower pulley member 158 relative to the upper pulley member 154 changes the effective diameter of the first pulley 146 which results in a change in output rotational speed of the drive shaft 148.

The upper housing 28 of the speed control assembly 12 includes a plurality of speed selector position markings 100 that provide a visual reference that allows the operator to observe the current relative speed selected. In an embodiment, the knob 42 of the speed adjustment assembly 37 is adjustable between four (4) selectable operative positions, as shown in FIG. 2. It should be understood by one of ordinary skill in the art that the knob 42 can be rotatable between any quantity of operative positions. It should also be understood by one of ordinary skill in the art that the knob 42 can also be infinitely adjustable to provide for any number of different relative speeds of the lawn mower 10. When the knob 42 is rotated clockwise to the end of the range of motion thereof, the knob 42 is in the first operative position and located adjacent to the first speed selector position marking 100; when the knob 42 is in rotated counter-clockwise slightly, the knob 42 is moved into the second operative position such that the knob is located adjacent to the second speed selector position marking 100; and the knob 42 is rotatable between each of the remaining operative positions that correspond to another speed selector position marking 100.

In an embodiment, the lower pulley member 158 is positionable in four (4) distinct operative positions. The quantity of operative positions of the lower pulley member 158 corresponds to the same quantity of operative positions of the knob 42 of the speed adjustment assembly 37. The speed adjustment assembly 37 is described herein as having a knob 42 with four operative positions for illustrative purposes, but one of ordinary skill in the art should understand that the knob 42 may be rotatable between any quantity of operative positions for providing a corresponding quantity of operative positions of the lower pulley member 158. For example, when the knob 42 is located in a first operative position, the lower pulley member 158 is located in the corresponding first operative position; in a similar manner, when the knob 42 is located in the fourth operative position, the lower pulley member 158 is located in the corresponding fourth operative position.

As the knob 42 of the speed adjustment assembly 37 is rotated from the first operative position (FIG. 14A) to the fourth operative position (FIG. 14B), the lower pulley member 158 translates away from the lower upper member 154 such that the gap 162 between the upper bearing surface 156 and the lower bearing surface 160 increases. In a similar manner, as the knob 42 is rotated from the fourth operative position to the first operative position, the lower pulley member 158 translates toward the upper pulley member 154 such that the gap 162 between the upper bearing surface 156 and the lower bearing surface 160 decreases. The movement of the lower pulley member 158 relative to the upper pulley member 154 effectively changes the diameter of the first pulley 146.

The effective diameter of the first pulley 146 changes in response to the width of the gap 162 between the upper and lower bearing surfaces 156, 160 in cooperation with the size of the V-shaped belt 152. For example, when the lower pulley member 158 is located in a first operative position (FIG. 14A) and the transmission assembly 140 is in the engaged state, the belt 152 contacts the upper and lower bearing surfaces 156, 160 at first distance $D_1$ spaced apart from the rotational axis of the first pulley 146. This first distance $D_1$ equates to a first effective diameter of the first pulley 146. When the lower pulley member 158 is located in a fourth operative position (FIG. 14B) and the transmission assembly 140 is in the engaged state, the belt 152 contacts the upper and lower bearing surfaces 156, 160 at a second distance $D_2$ spaced apart from the rotational axis of the first pulley 146. This second distance $D_2$ equates to a second effective diameter of the first pulley 146, wherein the second distance $D_2$ is less than the first distance $D_1$. As a result, as the effective diameter of the first pulley 146 decreases the rotational speed of the first pulley 146 increases when the diameter of the opposing pulley remains fixed and the rotational speed of the driving pulley of the engine 14 remains constant. The increased rotational speed of the first pulley 146 also likewise increases the rotational speed of the drive shaft 148 which results in the wheels 18 rotating faster and driving the lawn mower 10 at a faster speed. It should be understood by one of ordinary skill in the art that when the lower pulley member 158 is positioned at a location between the first and fourth operative positions that the effective diameter of the first pulley 146 is proportional to the operative position between the first and fourth operative positions.

The position of the transmission assembly 140 must compensate for the change in effective diameter of the first pulley 146. In other words, as the lower pulley member 158 translates away from the upper pulley member 154, the effective diameter of the first pulley 146 decreases. However, the position of the pulley (not shown) extending from the engine 14 as well as the relative rotational position of the transmission assembly 140 remains in substantially in the same positions, and the length of the belt 152 remains the same. As a result, as the lower pulley member 158 translates away from the upper pulley member 154 and the gap 162 widens such that the belt 152 contacts the upper and lower bearing surfaces 156, 160 at a location closer to the rotational axis of the first pulley 146 causing slack in the belt 152. To compensate for this slack in the belt 152 as a result in the change of speed by the knob 42, the knob 42 is also operatively connected to the indexer 40. One end of the first conduit 44 is attached to the catch 122 of the indexer 40, and as the knob 42 is rotated the rotational movement of the knob 42 is transferred to translational movement of the indexer 40 and the arm 120 thereof. As the indexer 40 translates, the end of the first conduit 44 translates in a like manner within the casing 31, and the movement of the end of the first conduit 44 attached to the indexer 40 results in corresponding movement of the bracket 142 and rotation of the transmission assembly 140 relative to the engine 14. For example, rotating the knob 42 from the first operative position to the second operative position—to increase the speed output of the transmission assembly 140—causes the lower pulley member 158 to translate away from the upper pulley member 154 to increase the rotational speed of the first pulley 146, but the decrease in the effective diameter of the first pulley 146 causes slack in the belt 152. However, this rotation of the knob 42 also causes the arm 120 of the indexer 40 to translate away from the first conduit outlet 62 which pulls the end of the first conduit 44 attached thereto, and the movement of the one end of the first conduit 44 results in the opposing end of the first conduit 44 that is attached to the bracket 142 to cause the transmission assembly 140 to rotate away from the engine 14, thereby taking up the slack that was caused by the decreased effective diameter of the first pulley 146. Further rotation of the knob 42 from the second operative position to the third or fourth operative positions for additional speed increase similarly reduces the effective diameter of the first pulley 146, but the slack in the belt 152 is offset by additional rotation of the transmission assembly 140 away from the engine 14 caused by further translation of the indexer 40 away from the first conduit outlet 62.

The transmission assembly 140 is operatively coupled to the speed engagement assembly 33 and the speed adjustment assembly 37 of the speed control assembly 12. In an embodiment, the speed engagement assembly 33 is operatively connected to the transmission assembly 140 for selectively actuating the transmission assembly 140 between an engaged position and a disengaged position with respect to the engine 14, and the speed adjustment assembly 37 is operatively connected to the transmission assembly 140 for selectively changing the relative location of the lower pulley member 158 with respect to the upper pulley member 154 which results in a change in the effective diameter of the first pulley 146 and hence the relative rotational output speed of the drive shaft 148. In operation, the first and second levers 34, 36 of the speed engagement assembly 33 extend from the casing 31 to allow an operator to selectively engage and disengage the transmission assembly 140 (FIGS. 14A-14B). When the transmission assembly 140 is engaged, there is full transmission of rotational power from the engine 14 to the wheels 18 for self-propelling the lawn mower 10. Also when the transmission assembly 140 is engaged, the operator is able to selectively adjust the output rotational speed of the transmission assembly 140—resulting in an adjustment of the travel speed of the lawn mower 10—by rotating the knob 42 of the speed adjustment assembly 37.

While preferred embodiments of the present disclosure have been described, it should be understood that the present disclosure is not so limited and modifications may be made without departing from the present disclosure. The scope of the present disclosure is defined by the appended claims, and all devices, process, and methods that come within the meaning of the claims, either literally or by equivalence, are intended to be embraced therein.

What is claimed is:

1. A transmission assembly for a self-propelled walk-behind lawn mower, said transmission assembly comprising:
   a housing;
   a first actuator attached to said housing;
   a second actuator attached to said housing;
   a first pulley rotatably driven by a belt extending between said first pulley and an engine, said first pulley is connected to said housing, said first pulley having an upper pulley member, a lower pulley member, and an effective diameter directly relating to a distance said upper pulley member is spaced apart from said lower pulley member, wherein said second actuator is configured to selectively move one of said upper or lower pulley members relative to the other of said upper or lower pulley members; and
   a drive shaft partially disposed within said housing, said drive shaft being operatively coupled to said first pulley, wherein rotation of said first pulley is transferred into rotation of said drive shaft to produce a rotational output of said drive shaft to drive a pair of ground-engaging wheels when said housing is in an engaged position, wherein translation of one of said pulley members relative to the other of said pulley members changes said distance between said upper and lower pulley members, wherein said change in said distance changes said effective diameter of said first pulley which results in a change of speed of said rotational output of said drive shaft, and wherein said first actuator is configured to move said housing selectively between an engaged position and a disengaged position, and said second actuator is configured to operate independently of said first actuator.

2. The transmission assembly of claim 1, wherein said housing is actuated between an engaged position and a disengaged position by a speed control assembly, the speed control assembly comprising:
   a casing; and
   a knob rotatably connected to said casing, wherein said knob is rotatable between a plurality of operative positions to adjust said speed of rotational output of said drive shaft.

3. The transmission assembly of claim 2, wherein said knob is operatively connected to said lower pulley member, wherein rotation of said knob between said plurality of operative positions results in said translation of said lower pulley member relative to said upper pulley member, thereby changing said effective diameter of said first pulley.

4. The transmission assembly of claim 3, wherein each of the plurality of operative positions produces a different relative speed of rotational output of said drive shaft.

5. The transmission assembly of claim 3, wherein said speed control assembly further comprises an indexer positioned within said casing, said indexer being operatively connected to said knob, wherein rotation of said knob causes translational movement of said indexer.

6. The transmission assembly of claim 5, wherein said indexer is operatively connected to said transmission assembly such that translation of said indexer causes said transmission assembly to rotate about said drive shaft.

7. The transmission assembly of claim 1, wherein said housing rotates about said drive shaft.

8. The transmission assembly of claim 2, further comprising a first lever rotatably connected to said casing.

9. The transmission assembly of claim 8, further comprising a second lever rotatably connected to said casing, wherein said rotation of at least one of said first lever and said second lever actuates a self-propelled transmission assembly between the engaged position and the disengaged position.

10. The transmission assembly of claim 9, wherein said housing is independently movable relative to said engine and wherein rotation of one of said at least one lever causes said housing to move relative to said engine, said movement actuates said housing between said engaged position and said disengaged position.

11. The transmission assembly of claim 9, wherein rotation of said knob of said speed control assembly is independent relative to rotation of said at least one lever of said speed control assembly.

12. The transmission assembly of claim 1, wherein said second actuator is configured to selectively move one of said upper or lower pulley members relative to the other of said upper or lower pulley members and move said housing away from said engine in order to remove slack in said belt created by translation of one of said pulley members to decrease the effective pulley diameter.

13. The transmission assembly of claim 1, wherein said second actuator is configured to selectively move one of said upper or lower pulley members relative to the other of said upper or lower pulley members and move said housing toward said engine in order to add slack in said belt created by translation of one of said pulley members to increase the effective pulley diameter.

14. A transmission assembly for a self-propelled walk-behind lawn mower, said transmission assembly comprising:
   a housing;
   a first pulley rotatably driven by a belt extending between said first pulley and an engine, said first pulley is connected to said housing, said first pulley having an upper pulley member, a lower pulley member, and an effective diameter, wherein said effective diameter directly relates to a distance said upper pulley member is spaced apart from said lower pulley member, wherein said lower pulley member is translatable relative to said upper pulley member;
   a drive shaft partially disposed within said housing, said drive shaft being operatively coupled to said first pulley wherein rotation of said first pulley is transferred into rotation of said drive shaft to produce a rotational output of said drive shaft to drive a pair of ground-engaging wheels when said housing is in an engaged position, wherein a change in said effective diameter results in a change of speed of said rotational output of said drive shaft;
   wherein movement of said housing selectively actuates said housing between said engaged position and a disengaged position; and
   a speed control assembly, said speed control assembly comprising:
      a casing;
      a knob rotatably connected to said casing, wherein said knob is rotatable between a plurality of operative positions which causes translation of said lower pulley member relative to said upper pulley members for changing said distance therebetween; and
      an indexer positioned within said casing, said indexer being operatively connected to said knob, wherein rotation of said knob causes translational movement of said indexer,
   wherein each of the plurality of operative positions produces a different relative speed of rotational output of said drive shaft,
   wherein said knob is operatively connected to said lower pulley member,
   wherein rotation of said knob translates said lower pulley member relative to said upper pulley member to change said effective diameter of said first pulley
   wherein movement of said housing and translation of said lower pulley member can occur independently.

15. The transmission assembly of claim 14, further comprising a rotatable actuator operatively connected to said knob and said lower pulley member, wherein said rotatable actuator is configured to selectively translate said lower pulley member relative to said upper pulley member in response to rotation of said knob.

16. The transmission assembly of claim 15, wherein the rotatable actuator further comprises a first bearing surface, said housing having a second bearing surface extending upwardly from said housing, said first and second bearing surfaces being in sliding contact therebetween.

17. The transmission assembly of claim 14, wherein said transmission assembly is configured to have said lower pulley member translate away from said upper pulley member upon rotation of said knob to make a shorter effective diameter of said first pulley and said knob is configured to move said housing to remove a resulting additional slack in said belt created by translation of said lower pulley member, wherein, regardless of said effective diameter, the amount of slack in said belt is the same in said disengaged position.

18. The transmission assembly of claim 14, wherein said transmission assembly is configured to have said lower pulley member translate toward said upper pulley member upon rotation of said knob to make a longer effective diameter of said first pulley and said knob is configured to move said housing to provide additional slack in said belt removed by translation of said lower pulley member, wherein, regardless of said effective diameter, the amount of slack in said belt is the same in said disengaged position.

* * * * *